(12) United States Patent
Soga et al.

(10) Patent No.: US 8,335,281 B2
(45) Date of Patent: Dec. 18, 2012

(54) DIVERSITY RECEIVING APPARATUS AND DIVERSITY RECEIVING METHOD

(75) Inventors: Shigeru Soga, Hyogo (JP); Shunsuke Sakai, Osaka (JP)

(73) Assignee: Panasonic Corporation, Osaka (JP)

( * ) Notice: Subject to any disclaimer, the term of this patent is extended or adjusted under 35 U.S.C. 154(b) by 562 days.

(21) Appl. No.: 12/304,019

(22) PCT Filed: Mar. 6, 2007

(86) PCT No.: PCT/JP2007/054270
§ 371 (c)(1),
(2), (4) Date: Apr. 5, 2010

(87) PCT Pub. No.: WO2007/148452
PCT Pub. Date: Dec. 27, 2007

(65) Prior Publication Data
US 2010/0183097 A1 Jul. 22, 2010

(30) Foreign Application Priority Data
Jun. 21, 2006 (JP) .................................. 2006-171711

(51) Int. Cl.
*H04L 27/06* (2006.01)
*H04L 1/02* (2006.01)
*H04B 1/10* (2006.01)
(52) U.S. Cl. ......................... 375/340; 375/347; 375/349
(58) Field of Classification Search ................... 375/260, 375/267, 285, 316, 340, 346–347, 349–350; 455/101–102, 132–133, 136–137
See application file for complete search history.

(56) References Cited

U.S. PATENT DOCUMENTS

| | | | | |
|---|---|---|---|---|
| 7,697,913 | B2 * | 4/2010 | Shatara | 455/296 |
| 8,229,010 | B2 * | 7/2012 | Adachi et al. | 375/260 |
| 2003/0185320 | A1 * | 10/2003 | Ueno et al. | 375/347 |
| 2005/0113048 | A1 * | 5/2005 | Miyahara et al. | 455/137 |

(Continued)

FOREIGN PATENT DOCUMENTS

| JP | 2002-26867 | 1/2002 |
|---|---|---|
| JP | 2004-242191 | 8/2004 |
| JP | 2005-278111 | 10/2005 |

(Continued)

OTHER PUBLICATIONS

International Search Report issued May 29, 2007 in the International (PCT) Application No. PCT/JP2007/054270.

*Primary Examiner* — Khanh C Tran
(74) *Attorney, Agent, or Firm* — Wenderoth, Lind & Ponack, L.L.P.

(57) ABSTRACT

There is provided a diversity receiving apparatus (1) that comprises: a receiving unit (4) for receiving a frequency-division multiplexing signal on which a carrier group is multiplexed; a first demodulating unit (5) for outputting a first data carrier and a first transmission control carrier; a second demodulating unit (6) for outputting a second data carrier and a second transmission control carrier; a timing adjusting unit (7) for synchronizing processing timing of the first demodulating unit (5) and the second demodulating unit (6); a first combining/selecting unit (60) for combining or selecting a first transmission control carrier and a second transmission control carrier; a second combining/selecting unit (8) for combining or selecting a first data carrier and a second data carrier; a decoding unit (13) for decoding a transmission control signal using the transmission control carrier selected by the first combining/selecting unit (60); and a detecting unit (14) for detecting frame synchronization.

19 Claims, 15 Drawing Sheets

U.S. PATENT DOCUMENTS

| | | | |
|---|---|---|---|
| 2006/0166634 A1* | 7/2006 | Ido | 455/277.1 |
| 2006/0293006 A1* | 12/2006 | Taniguchi et al. | 455/132 |
| 2009/0207927 A1* | 8/2009 | Watanabe et al. | 375/260 |
| 2009/0270031 A1* | 10/2009 | Yokonaga et al. | 455/39 |

FOREIGN PATENT DOCUMENTS

| | | |
|---|---|---|
| JP | 2005-286362 | 10/2005 |
| WO | 2006/011424 | 2/2006 |

\* cited by examiner

Fig. 9

|  | 1 | 2 | 3 |
|---|---|---|---|
| T1 / T2 | 1 | 2 | 3 |
| 1 | $\dfrac{T1+T2}{2}$ | $\dfrac{2\times T1+T2}{3}$ | $\dfrac{3\times T1+T2}{4}$ |
| 2 | $\dfrac{T1+2\times T2}{3}$ | $\dfrac{T1+T2}{2}$ | $\dfrac{3\times T1+2\times T2}{5}$ |
| 3 | $\dfrac{T1+3\times T2}{4}$ | $\dfrac{2\times T1+3\times T2}{5}$ | $\dfrac{T1+T2}{2}$ |

US 8,335,281 B2

DIVERSITY RECEIVING APPARATUS AND DIVERSITY RECEIVING METHOD

TECHNICAL FIELD

The present invention relates to a diversity receiving apparatus operable to receive a frequency-division multiplexing signal, especially an orthogonal frequency division multiplexing signal (hereinafter, it is called as an "OFDM signal") used for digital terrestrial television services, and a diversity receiving method related thereto.

BACKGROUND ART

In Japan, digital terrestrial television services according to the ISDB-T standard have started since 2003. Moreover, analog broadcasting has been digitalized in each country of the world, such as Europe, North America, South America, and Asia, and digital terrestrial television services have been starting. In many countries, technology, which is equivalent to or based on the ISDB-T standard in Japan, is used. Especially, an OFDM signal, of which orthogonal multiplexing is performed on a plurality of carriers on a frequency axis, is used.

Although the OFDM signal has a characteristic of being resistance to a multipath, in order to further improve quality of reception in reception, performing diversity receiving for every career, which is multiplexed on a frequency axis is proposed (for example, See Document 1).

In order to perform diversity receiving for every carrier, a plurality sets of an antenna and a demodulating unit corresponding thereto (hereinafter called "blanch") are needed. Each demodulating unit included each branch must be provided with all elements from an element for analog-to-digital converting a received signal to an element for demodulating carriers according to time-frequency conversion independently. For this reason, in prior art, an element for demodulating transmission carriers including control information, such as a modulation method, and an element for detecting frame synchronization.

In the diversity receiving apparatus for every career according to the conventional technology, there is a problem which circuit scale of a receiving apparatus increases. Moreover, in decoding of a transmission control carrier, a memory is needed for the decoding. In detection of frame synchronization, a memory is needed for judgment. Since these memories are needed to be independently provided for every decoding unit, the circuit scale increases.

Moreover, when decoding of the transmission control carrier and/or the frame synchronization are separately provided, in one receiving apparatus, a plurality of results for the decoding of the transmission control carrier and the detection of the frame synchronization can be acquired. However, in the receiving apparatus, since only one result is considered, if there is a plurality of results, the reliability of judgment for the result may become difficult, and the processing procedures until starting the actual decoding after receiving the result may become complicated.

Recently, in order to improve the quality of reception in a mobile terminal, using three or more branches for the diversity receiving has been considered. In this case, increase of the circuit scale and complication of the processing may occur more remarkably.

[Document 1] Published Japanese patent Application 2004-242191

DISCLOSURE OF INVENTION

Problem(s) to be Solved by Invention

In view of the above, an object of the present invention is to provide a diversity receiving apparatus capable of establishing both of suppressing the increase of circuit scale and increasing the reliability and usability of decoding of the transmission control signal and the detection result of the frame, and the diversity receiving method related thereto.

Means for Solving Problem(s)

A first aspect of the present invention provides a diversity receiving apparatus comprising, a receiving unit operable to receive a frequency-division multiplexing signal that a carrier group including a data carrier, a pilot carrier and a transmission control carrier has been multiplexed thereon to output a receiving signal; a first demodulating unit operable to demodulate the receiving signal to output a first data carrier; a second demodulating unit operable to demodulate the receiving signal to output a second data carrier; a timing adjusting unit operable to synchronize a processing timing of demodulating a carrier group by the first demodulating unit and a processing timing of demodulating a carrier group by the second demodulating unit; and a combining/selecting unit operable to perform at least one of combining the first data carrier with the second data carrier, and selecting one of the first data carrier and the second data carrier, wherein a each of the first demodulating unit and the second demodulating unit comprises, an analog-to-digital converter operable to digitize the receiving signal; a wave detecting unit operable to detect a signal outputted by the analog-to-digital converter; and a time-to-frequency converting unit operable to map a signal outputted by the wave detecting unit from a signal along a time axis to a signal along a frequency axis, wherein either the first demodulating unit or the second demodulating unit comprises, a decoding unit operable to decode a transmission control signal from a signal outputted by the time-to-frequency converting unit; and a detecting unit operable to detect a frame synchronization from a signal outputted by the time-to-frequency converting unit.

According to the above configuration, it is possible to prevent increasing circuit scale caused by increasing number of demodulating unit in the diversity receiving apparatus. Further, the diversity receiving apparatus can improve reliability of decoding a transmission control signal and detecting frame synchronization. In addition, the diversity receiving apparatus can perform process based on the transmission control signal and the frame synchronization easily.

A second aspect of the present invention provides a diversity receiving apparatus comprising, a receiving unit operable to receive a frequency-division multiplexing signal that has been multiplexed thereon a carrier group including a data carrier, a pilot carrier and a transmission control carrier to output a receiving signal; a first demodulating unit operable to demodulate the receiving signal to output a first data carrier and a first transmission control carrier; a second demodulating unit operable to demodulate the receiving signal to output a second data carrier and a second transmission control carrier; a timing adjusting unit operable to synchronize a processing timing of demodulating a carrier group by the first demodulating unit and a processing timing of demodulating a carrier group by the second demodulating unit; a first combining/selecting unit operable to perform at least one of combining the first transmission control carrier with the second transmission control carrier, and selecting either the first transmission control carrier or the second transmission control carrier; a second combining/selecting unit operable to perform at least one of combining the first data carrier with the second data carrier, and selecting either the first data carrier or the second data carrier; a decoding unit operable to decode a transmission control signal from a transmission control carrier combined or selected by the first combining/selecting unit; and a detecting unit operable to detect a frame synchronization from a transmission control carrier combined or selected by the first combining/selecting unit.

According to the above configuration, it is possible to prevent increasing circuit scale caused by increasing number of demodulating unit in the diversity receiving apparatus. Further, the diversity receiving apparatus can improve reliability of decoding a transmission control signal and detecting frame synchronization. In addition, the diversity receiving apparatus can perform process based on the transmission control signal and the frame synchronization easily.

A third aspect of the present invention provides a diversity receiving apparatus, wherein the decoding unit decodes the transmission control signal from a transmission control carrier combined by the first combining/selecting unit, and the detecting unit detects the frame synchronization from a transmission control carrier combined by the first combining/selecting unit.

According to the above configuration, it is possible to improve quality of decoding the transmission control signal and detecting the frame synchronization.

A forth aspect of the present invention provides a diversity receiving apparatus, wherein: the first demodulating unit comprises a first waveform equalizer operable to calculate a first reliability value indicating reliability of the first transmission control carrier and the first data carrier, and the second demodulating unit comprises a second waveform equalizer operable to calculate a second reliability value indicating reliability of the second transmission control carrier and the second data carrier.

According to the above configuration, the diversity receiving apparatus can perform to combine or select carrier in at least one of the first combining/selecting unit and the second combining/selecting unit. As a result, quality of reception is improved.

A fifth aspect of the present invention provides a diversity receiving apparatus, wherein the first combining/selecting unit selects either the first transmission control carrier or the second transmission control carrier in accordance with the first reliability value and the second reliability value.

According to the above configuration, quality of decoding the transmission control signal and detecting the frame synchronization are improved, because the diversity receiving apparatus decodes the transmission control signal and detects the frame synchronization based on a selected transmission control carrier.

A sixth aspect of the present invention provides a diversity receiving apparatus, wherein the first combining/selecting unit combines the first transmission control carrier with the second transmission control carrier in maximum ratio in accordance with the first reliability value and the second reliability value.

According to the above configuration, C/N ratio of the transmission control carrier is improved and quality of decoding the transmission control signal and detecting the frame synchronization are improved.

A seventh aspect of the present invention provides a diversity receiving apparatus, wherein the second combining/selecting unit selects either the first data carrier or the second data carrier in accordance with the first reliability value and the second reliability value.

According to the above configuration, quality of reception is improved because the diversity receiving apparatus demodulates the data carrier including image data and audio data based on a selected data carrier.

An eighth aspect of the present invention provides a diversity receiving apparatus, wherein the second combining/selecting unit combines the first data carrier with the second data carrier in maximum ratio in accordance with the first reliability value and the second reliability value.

According to the above configuration, C/N ratio of data carrier and quality of reception are improved.

A ninth aspect of the present invention provides a diversity receiving apparatus, wherein the frequency-division multiplexing signal comprises a one symbol including a predetermined number of carriers, and the timing adjusting unit synchronizes a processing timing of the symbol by the first demodulating unit and a processing timing of the symbol by the second demodulating unit.

According to the above configuration, the diversity receiving apparatus can combine or select corresponding carriers at frequency axis outputted from a plurality of demodulating unit.

A tenth aspect of the present invention provides a diversity receiving apparatus, each of the first demodulating unit and the second demodulating unit comprises, an analog-to-digital converter operable to digitize the receiving signal; a wave detecting unit operable to detect a signal outputted by the analog-to-digital converter; a storing unit operable to store a signal outputted from the wave detecting unit; and a time-to-frequency converting unit operable to map a signal outputted by the storing unit from a signal along a time axis to a signal along a frequency axis, wherein the timing adjusting unit synchronizes a processing timing of demodulating a carrier group by the first demodulating unit and a processing timing of demodulating a carrier group by the second demodulating unit, by reading a signal stored by the storing unit in the first demodulating unit and a signal stored by the storing unit in the second demodulating unit at the same timing.

According to the above configuration, the diversity receiving apparatus can combine or select corresponding carriers along the frequency axis, the carriers being outputted from a plurality of demodulating unit.

An eleventh aspect of the present invention provides a diversity receiving apparatus, further comprising a control unit operable to control at least one of the first demodulating unit, the second demodulating unit, wherein the first demodulating unit comprises a first judging unit operable to judge reception status of the first demodulating unit, the first combining/selecting unit and the second combining/selecting unit, wherein the second demodulating unit comprises a second judging unit operable to judge reception status of the second demodulating unit, and wherein the control unit controls at least one of the first demodulating unit, the second demodulating unit, the first combining/selecting unit and the second combining/selecting unit, in accordance with a judgment result of the first judging unit and the second judging unit.

According to the above configuration, it is possible prevent deterioration of quality of reception caused by diversity receiving, when a demodulating unit having bad quality of reception exists.

A twelfth aspect of the present invention provides a diversity receiving apparatus, wherein the first judging unit judges reception status of the first demodulating unit in accordance with at least one of amplitude value and variation value of the first pilot carrier, and wherein the second judging unit judges reception status of the second demodulating unit in accordance with at least one of an amplitude value and a variation value of the second pilot carrier.

A thirteenth aspect of the present invention provides a diversity receiving apparatus, wherein the first judging unit judges reception status of the first demodulating unit appropriate when the amplitude value and the variation value of the first pilot carrier is greater than a predetermined threshold value, the first judging unit judges reception status of the first demodulating unit inappropriate when the amplitude value and the variation value of the first pilot carrier is equal or less than the predetermined threshold value, thereby output a judgment result to the control unit, and wherein the second judging unit judges reception status of the second demodulating unit appropriate when the amplitude value and the variation value of the second pilot carrier is greater than a predetermined threshold value, the second judging unit judges reception status of the second demodulating unit inappropriate when the amplitude value and the variation value of the second pilot carrier is equal or less than the predetermined threshold value, thereby output a judgment result to the control unit.

According to the above configurations, the diversity receiving apparatus can judge reception status appropriately.

A fourteenth aspect of the present invention provides a diversity receiving apparatus, wherein the control unit performs at least one of initializing storing value stored and reducing clock signal to a demodulating unit judged as inappropriate.

According to the above configuration, it is possible to redress the balance between improving the quality of reception of diversity receiving and reducing power consumption. Specially, reducing power consumption is prevailed over improving the quality of reception, when it is difficult to improve the quality of reception. Thereby, the diversity receiving apparatus having high level usability is realized. In addition, malfunction when restarting the stopping a demodulating unit caused by stopping clock signals does not occur, because the storing value prior to the stopping is initialized.

A fifteenth aspect of the present invention provides a diversity receiving apparatus, wherein each of the first demodulating unit and the second demodulating unit comprises a correcting unit operable to correct an amount of time frequency off-set to the receiving signal, wherein the first judging unit judges reception status of the first demodulating unit appropriate or inappropriate, wherein the second judging unit judges reception status of the second demodulating unit appropriate or inappropriate, wherein the control unit keeps the amount of time frequency off-set stored by the correcting unit, and performs at least one of initializing storing value stored and reducing clock signal to a demodulating unit judged inappropriate.

According to the above configuration, malfunction when restarting the stopping demodulating unit does not occur. In addition, it is possible to shorten time from the restarting to real processing, because the amount of time frequency off-set is used immediately after regressing.

A sixteenth aspect of the present invention provides a diversity receiving apparatus, wherein each of the first judging unit and the second judging unit judges a reception status of a demodulating unit possessing the lower amplitude value among the amplitude values of the first demodulating unit and the second demodulating unit inappropriate, when a difference amplitude value between the first pilot carrier and the second pilot carrier is equal or greater than predetermined threshold value, wherein the control unit performs at least one of initializing a value stored by the demodulating unit judged inappropriate and reducing clock signals to the demodulating unit judged inappropriate.

According to the above configuration, the diversity receiving apparatus can judge reception status of the demodulating unit appropriate or inappropriate in view of reception status of each demodulating units and difference of reception status among the demodulating units. As a result, it is possible to further improve the quality of reception of diversity receiving, because the demodulating result of demodulating unit having worse quality of reception is removed from the diversity receiving.

A seventeenth aspect of the present invention provides a diversity receiving apparatus, wherein the first judging unit integrates amplitude values of a predetermined number of first pilot carriers and integrates amplitude values of a predetermined number of first data carriers, wherein the first judging unit judges reception status of first demodulating unit appropriate when an integrated value of the first pilot carriers is larger than an integrated value of the first data carriers, the judging unit judges a reception status of the first demodulating unit inappropriate when the integrated value of the first pilot carriers is equal or less than the integrated value of the first data carriers, wherein the second judging unit integrates amplitude values of a predetermined number of second pilot carriers and integrates amplitude values of a predetermined number of the second data carriers, wherein the second judging unit judges reception status of the second demodulating unit appropriate when the integrated value of the second pilot carriers is larger than the integrated value of the second data carriers, the judging unit judges reception status of the second demodulating unit inappropriate when the integrated value of the second pilot carriers is equal or less than the integrated value of the second data carriers.

According to the above configuration, the diversity receiving apparatus can judge reception status appropriate or inappropriate, in accordance with the pilot carrier and the data carrier.

An eighteenth aspect of the present invention provides a diversity receiving apparatus, further comprising a correcting unit operable to detect and correct an amount of time frequency off-set in accordance with at least one of a first carrier group demodulated by the first demodulating unit and a second carrier group demodulated by the second demodulating unit.

According to the above configuration, it is possible to prevent increasing circuit scale, because the correcting unit is shared among a plurality of demodulating unit.

Effect of Invention

According to the present invention, in the diversity receiving apparatus for performing the diversity for every career of a frequency-division multiplexing signal, even when the number of the demodulating units increases, it is possible to suppress the increase of the circuit scale.

In addition, even when there are a plurality of demodulating units, demodulating the transmission control signal and detecting frame synchronization in common enables to lighten load of process utilizing the demodulation result and the detection result. Combining/selecting the transmission control carriers based on the reliability value enables to improve decoding accuracy in decoding the transmission control signal and detection accuracy in detecting the frame synchronization.

Moreover, when a local oscillator and an AFC circuit are shared regardless of increase of the number of the decoding units, it is possible to suppress the increase of the circuit scale of the diversity receiving apparatus.

Furthermore, according to the judgment of the reception status for every branch in the diversity receiving apparatus provided with a plurality of branches, it is possible to reduce the power consumption of the branch whose reception status is bad. Thus, it is possible to realize the balance between the reduction of the power consumption for the diversity receiving apparatus and the improvement in the quality of reception.

BRIEF DESCRIPTION OF DRAWINGS

FIG. 9 indicates explanation of maximum ratio combining for a transmission control carrier according to Embodiment 2 of the present invention;

DESCRIPTION OF SYMBOLS

Figure 1:
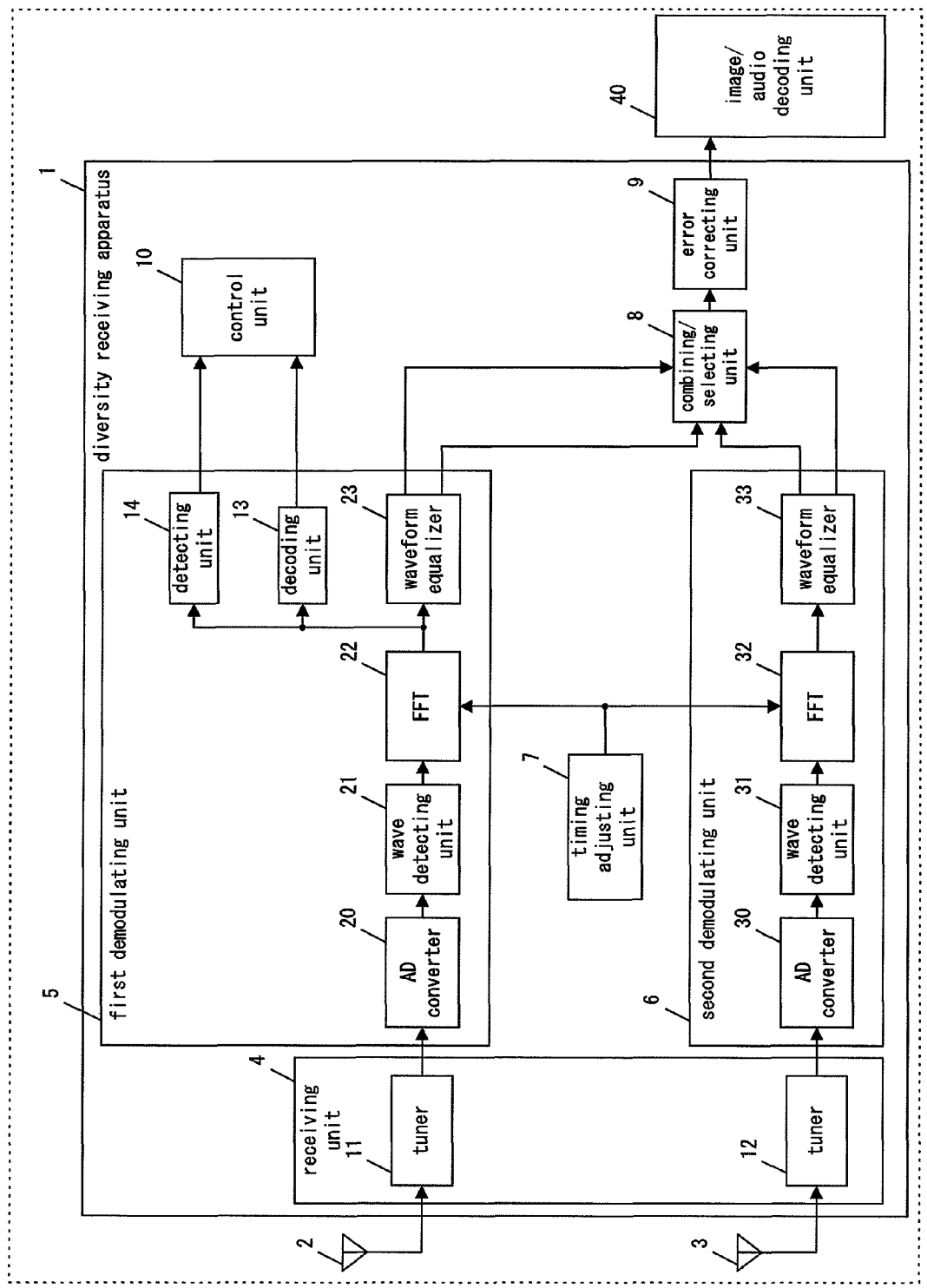
FIG. 1 is block diagram of a diversity receiving apparatus according to Embodiment 1 of the present invention.

1: Diversity receiving apparatus
2, 3: Antenna
4: Receiving unit
5: First demodulating unit
6: Second demodulating unit
7: Timing adjusting unit
8: Combining/selecting unit
9: Error correcting unit
10: Control unit
13: Decoding unit
14: Detecting unit
20, 30: Analog-to-digital converter
21, 31: Wave detecting unit
22, 32: FFT
23, 33: Waveform equalizer
40: Image/audio decoding unit

THE MODE FOR CARRYING OUT THE INVENTION

Hereafter, referring to the accompanying drawings, preferred embodiments of the present invention will be explained.

Embodiment 1

Referring to FIGS. 1 to 5, Embodiment 1 will now be explained.

Figure 2:
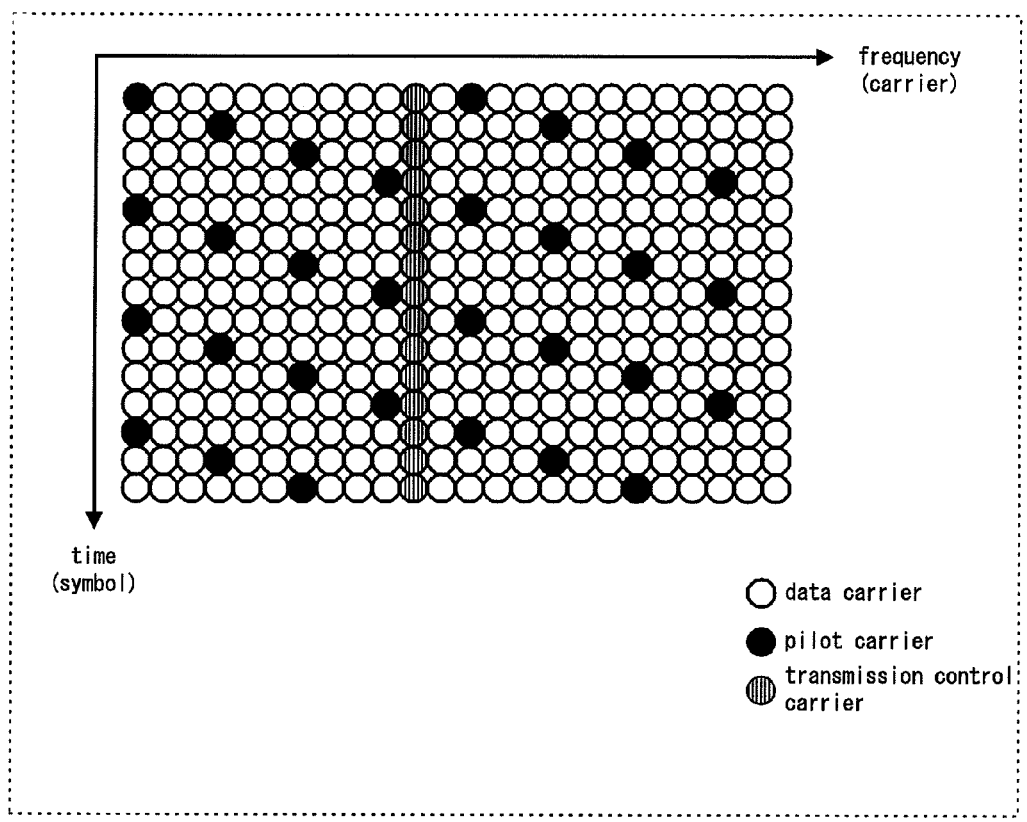
FIG. 2 indicates explanation of an OFDM signal according to Embodiment 1 of the present invention.

FIG. 1 is a block diagram of a diversity receiving apparatus according to Embodiment 1 of the present invention. FIG. 2 indicates explanation of an OFDM signal according to Embodiment 1 of the present invention.

In the present description, an OFDM signal defined by the ISDB-T standard, which is the standard of digital terrestrial television services, is explained as an example of a frequency-division multiplexing signal. Moreover, in the OFDM signal, a plurality of carriers is multiplexed along a frequency axis. The OFDM signal includes a data carrier that an image or audio data is modulated thereon, a pilot carrier for judging a reception characteristic, and a transmission control carrier including information, such as a transmission method. In addition, the OFDM signal is merely an example of the frequency-division multiplexing signal in the present invention. Thus, the frequency-division multiplexing signal of the present invention broadly includes communication signals, such as an FDM signal and an SS-OFDM signal.

(Entire Outline)

A diversity receiving apparatus 1 is provided with: a receiving unit 4 operable to receive an OFDM signal and to output a receiving signal; a first demodulating unit 5 operable to demodulate the receiving signal and to output a first data carrier group; a second demodulating unit 6 operable to demodulate the receiving signal and to output a second data carrier group; and a combining/selecting unit 8 operable to combine or select the first data carrier group and the second data carrier group. Furthermore, each of the first demodulating unit 5 and the second demodulating unit 6 is provided with: analog-to-digital converters 20 and 30 (shown with the words of "AD converter" in Figs.) operable to digitize a receiving signal, respectively; wave detecting units 21 and 31 operable to detect output of the analog-to-digital converters 20 and 30, respectively; and fast Fourier transforming units (hereafter, they are written as "FFTs") 22 and 32 operable to map a signal outputted by the wave detecting unit 21 and 31 from a signal along a time axis to a signal along a frequency axis, respectively.

In addition, the FFT is an example of an element performing the time-frequency conversion. Thus, an element, which performs the time-frequency conversion by applying a fractal other than the FFT, may be used.

Moreover, the first demodulating unit 5 is provided with: a decoding unit 13 operable to demodulate a transmission control signal from the transmission control carrier included in the output of the FFT 22; and a detecting unit 14 operable to detect frame synchronization.

Only the first demodulating unit 5 between the two demodulating units is provided with the decoding unit 13 and the detecting unit 14. It is because the OFDM signals received by the antennas 2 and 3 are the same, and the decoding of the transmission control signal and the frame synchronization may be performed by any demodulating unit.

The decoding unit 13, which is only provided with the first decoding unit 5, decodes the transmission control signal. The detecting unit 14 detects the frame synchronization. On the other hand, the second demodulating unit 6 does not perform the decoding of the transmission control signal and the detection of the frame synchronization, and is not provided with a decoding unit and a detecting unit that are necessary for the decoding and the detection. The decoding unit 13 and the detecting unit 14, which are provided in the first demodulating unit 5, perform the common processing in the diversity receiving apparatus 1.

The decoding unit 13 outputs a decoding result to a control unit 10. The detecting unit 14 outputs a detection result to the control unit 10. The control unit 10 judges a modulating method and a broadcast method based on the received decoding result. The control unit 10 notifies a receiving unit 4, the first demodulating unit 5, the second demodulating unit 6, and an error correcting unit 9 of the demodulating processing to be performed according to the judgment result. Similarly, based on the frame synchronization, the control unit 10 notifies the receiving unit 4, the first demodulating unit 5, the second demodulating unit 6, and the error correcting unit 9 of a border of reception and/or demodulating. As the result, the diversity receiving apparatus 1 can perform the suitable reception and demodulating on the broadcast signal to be sent. Since the control unit 10 can judge the border of the broadcast method and the processing based on the transmission control signal and the frame synchronization outputted by the first demodulating unit 5, which is one of the plurality of demodulating units.

In addition, since the diversity receiving apparatus 1 according to Embodiment 1 shown in FIG. 1 may be provided with one of each of the decoding unit 13 and the detecting unit 14 regardless of the increase of the number of branches, thereby enabling to suppress the increase of the circuit scale.

As mentioned above, even though the reduction of processing load and the suppression of increase of the circuit scale are realized, the decoding of the transmission control signal and the detection of the frame synchronization, which are necessary for the diversity receiving apparatus 1, are performed.

Next, detail of each element will be explained.

(Antenna)

The antennas 2 and 3 receive an OFDM signal. The number of the antennas corresponds to the number of demodulating units. In FIG. 1, since there are two demodulating units of the first demodulating unit 5 and the second demodulating unit 6, two antennas of the antenna 2 and the antenna 3 are provided.

(Tuner)

A tuner 11 is connected to the antenna 2; and a tuner 12 is connected to the antenna 3. Based on the center frequency according to the broadcast bandwidth, both of the tuners select a specific bandwidth of the OFDM signal received by the antennas 2 and 3, and then receive it.

The tuners 11 and 12 output the OFDM signal received in the specific bandwidth to the first demodulating unit 5 and the second demodulating unit 6, respectively as a receiving signal.

(Analog-to-Digital Converter)

The first demodulating unit 5 and the second demodulating unit 6 are provided with analog-to-digital converters 20 and 30, respectively.

The analog-to-digital converter 20 digitizes the receiving signal from the tuner 11. Similarly, the analog-to-digital converter 30 digitizes the receiving signal from the tuner 12. The analog-to-digital converters 20 and 30 have resolution according to the specification of the diversity receiving apparatus 1.

The analog-to-digital converters 20 and 30 output the digital signal to wave detecting units 21 and 31.

(Wave Detecting Unit)

Each of the first demodulating unit 5 and the second demodulating unit 6 is provided with the wave detecting units 21 and 31, respectively.

The wave detecting units 21 and 31 orthogonally detect the digitalized receiving signals. The wave detecting unit 21 and 31 output the signals, which are orthogonally detected, to FFTs 22 and 32.

(FFT)

Each of the first demodulating unit 5 and the second demodulating unit 6 is provided with the FFT 22 and the FFT 32, respectively. Each of the FFT 22 and the FFT 32 is just an example of the time-frequency converting unit operable to map signals outputted by the wave detecting units 21 and 31 from a signal along a time axis to a signal along a frequency axis. As long as processing the function of mapping a signal from a signal along a time axis to a signal along a frequency axis, a time-frequency converting unit that uses fractal may be used.

The FFT 22 demodulates the carrier group, which is multiplexed along the frequency axis, by mapping the receiving signal in the first demodulating unit 5 from a signal along the time axis to a signal along the frequency axis. Here, a carrier group, which the FFT 22 demodulates, is a first carrier group. The first carrier group includes a plurality of carriers; and each of the plurality of carriers is orthogonally multiplexed each other.

The first carrier group includes a data carrier, a pilot carrier, and a transmission control carrier according to the OFDM signal defined by the ISDB-T standard.

The FFT 22 outputs the first carrier group, which is demodulated, to a waveform equalizer 23, the decoding unit 13, and the detecting unit 14. Here, a data carrier, which the FFT 22 demodulated, is called as a data carrier group.

The FFT 32 demodulates the carrier group, which is multiplexed along the frequency axis, by mapping the receiving signal in the second demodulating unit 6 from a signal along the time axis to a signal along the frequency axis. Here, the carrier group, which the FFT 32 demodulates, is a second carrier group. The second carrier group includes a plurality of carriers; and each of the plurality of carriers is orthogonally multiplexed each other.

Similar to the first carrier group, the second carrier group, according to the OFDM signal defined by the ISDB-T standard, includes a data carrier, a pilot carrier, and a transmission control carrier. Here, the data carrier group, which the FFT demodulated, is called as the second data carrier group.

The FFT 32 outputs the second carrier group, which is demodulated, to a waveform equalizer 33.

In addition, since the FFTs 22 and 32 perform the time-frequency conversion after receiving the output of the wave detecting units 21 and 31, it is preferable that the FFTs 22 and 32 possess the function of adjusting an extracting range (a window position).

The OFDM signal, which is demodulated by the FFTs 22 and 32, is shown in FIG. 2 typically.

In FIG. 2, the horizontal axis is a frequency axis, and a vertical axis is a time axis. Each of the circle signs written in FIG. 2 indicates each carrier included in a carrier group. Each of the carriers is multiplexed along the frequency axis. In the time axis, these multiplexed carriers are defined as one symbol. This symbol is multiplexed along the time axis. The decoding unit 13 decodes a transmission control carrier. The control unit 10 judges a broadcast method and a modulating method. Similarly, the detecting unit 14 detects frame synchronization using the transmission control carrier. Here, a frame is a unit on the basis of a predetermined number of symbols.

As clearly shown in FIG. 2, the carrier group includes the data carrier, in which an image or audio data is modulated, the pilot carrier, and the transmission control carrier. The carrier group is outputted to the waveform equalizers 23 and 33, the decoding unit 13, and the detecting unit 14.

(Waveform Equalizer)

Each of the first demodulating unit 5 and the second demodulating unit 6 is provided with the waveform equalizers 23 and 33.

After receiving the first carrier group, the waveform equalizer 23 performs amplitude/phase control of the first carrier group according to the pilot carrier included in the first carrier group, and also calculates a first reliability value that indicates the reliability of the first data carrier.

The pilot carrier has a given amplitude and phase. The amount of variation of amplitude and phase for the received pilot carrier is calculated by dividing the actual pilot carrier, which has been received in the waveform equalizer 23, by the pilot carrier having the given amplitude and phase. A channel response is presumed from this amount of variation.

The waveform equalizer 23 corrects each of the amplitude and phase for the first data carrier, which is demodulated by the FFT 22, according to the presumed channel response. Thus, it is possible to improve the quality of reception.

The waveform equalizer 23 outputs the first data carrier group whose amplitude and phase are corrected and the calculated first reliability value to the combining/selecting unit 8.

The waveform equalizer 33 included in the second demodulating unit 6 also has the same function as the waveform equalizer 23, and performs the same processing. The waveform equalizer 33 calculates a second reliability value that indicates the reliability of the second data carrier.

(Timing Adjusting Unit)

A timing adjusting unit 7 synchronizes processing timing of a carrier to be demodulated by the FFT 22 and the FFT 32. As clearly shown in FIG. 2, since the PFDM signal has a unit of symbol, the timing adjusting unit 7 aligns the head position of the position to be inputted into the FFT 22 included in the first demodulating unit 5 with the head position of the symbol to be inputted into the FFT 32 included in the second demodulating unit 6 in terms of time.

With the timing adjustment, it is possible to synchronize the processing timing of carrier for the first carrier group and the processing timing of carrier for the second carrier group to be inputted in to the combining/selecting unit 8 that will be mentioned later Referring to FIG. 3 and FIG. 4, the timing adjusting unit 7 will be explained.

Figure 3:
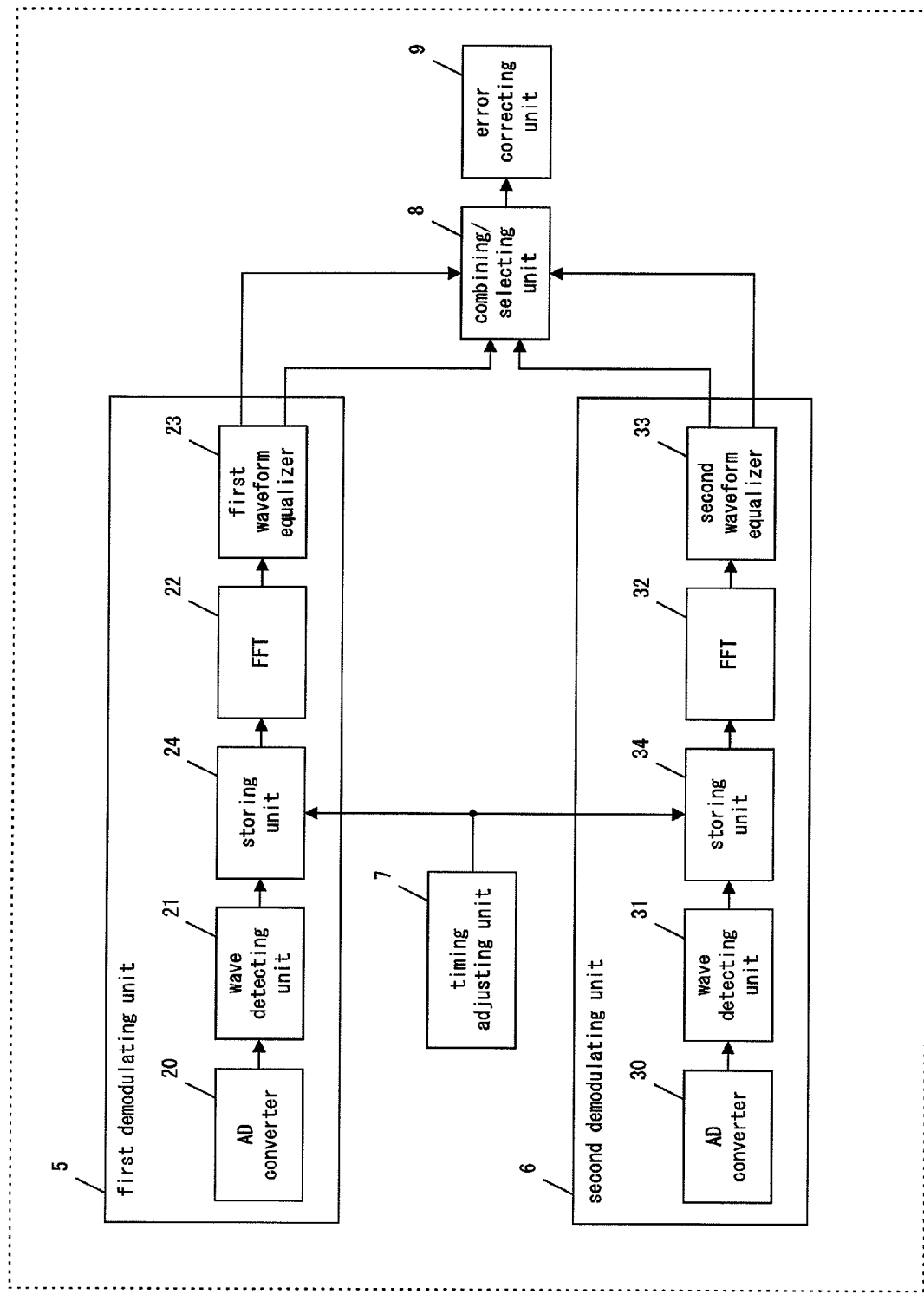
FIG. 3 is a block diagram of a timing adjusting unit and the neighboring thereto according to Embodiment 1 of the present invention.

FIG. 3 is a block diagram of a timing adjusting unit and the neighboring thereto according to Embodiment 1 of the present invention. FIG. 4 is a timing chart explaining timing adjustment according to Embodiment 1 of the present invention.

The first demodulating unit 5 is provided with a storing unit 24 that stores the output of the wave detecting unit 21. The second demodulating unit 6 is provided with a storing unit 34 that stores the output of the wave detecting unit 31. Each of the storing unit 24 and the storing unit 34 stores receiving signals for one symbol. At the same predetermined timing, the timing adjusting unit 7 reads out the stored receiving signals for the unit of symbols from both of the storing unit 24 and the storing unit 34. Then, the timing adjusting unit 7 outputs the receiving signals to the FFT 22 and the FFT 32. As a result, when the FFT 22 and the FFT 32 start the demodulating, it is possible to perform the demodulating from the head position of the same symbol. Thus, the timing of the carrier for the demodulating is synchronized.

Figure 4:
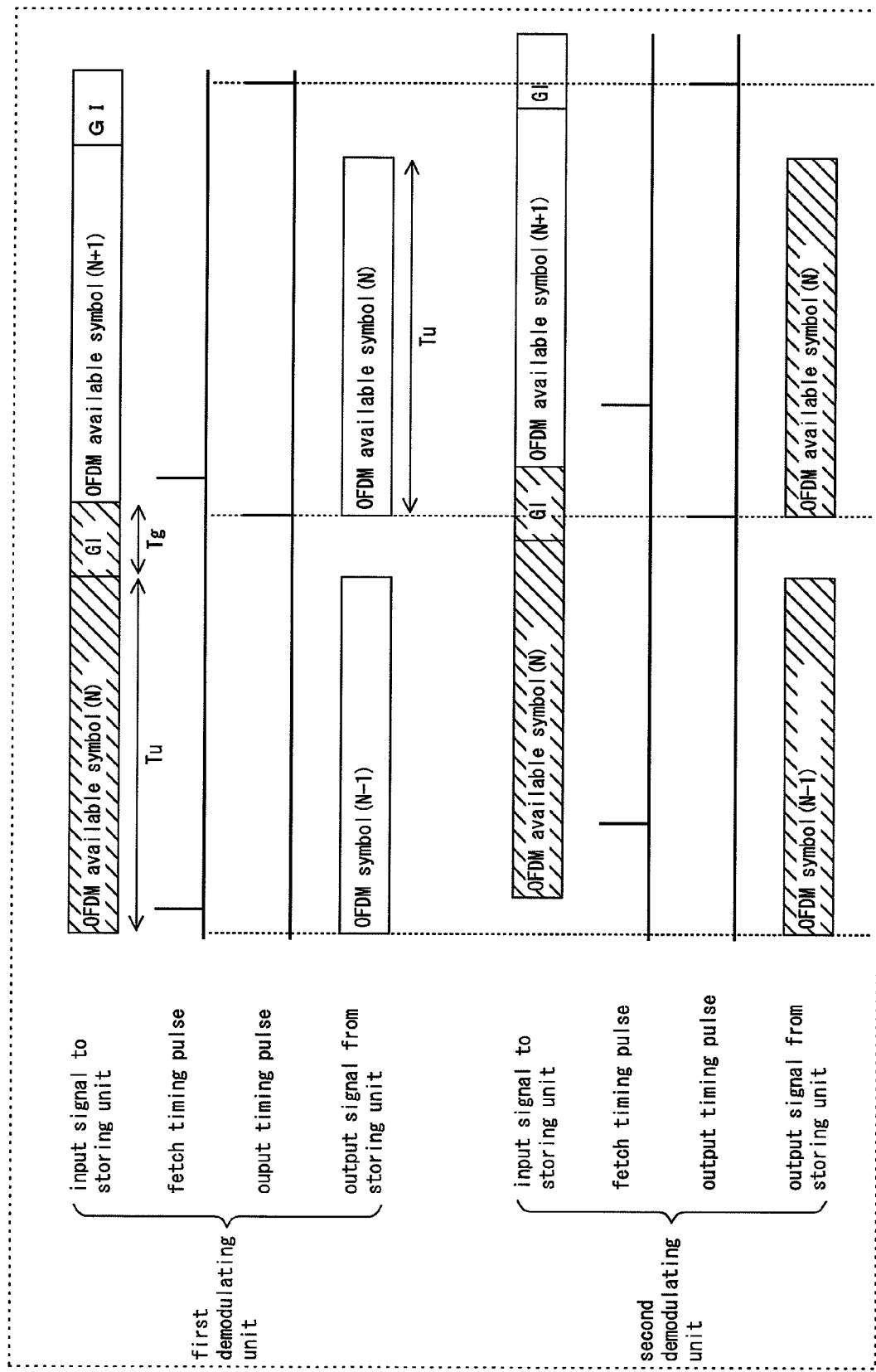
FIG. 4 is a timing chart explaining timing adjustment according to Embodiment 1 of the present invention.

The timing adjustment, which uses the storing units 24 and 34, is shown in FIG. 4.

In FIG. 4, the upper half of the timing chart shows the processing of the first demodulating unit 5, and the lower half of the timing chart shows the processing of the second demodulating unit 6. Since each of the first demodulating unit 5 and the second demodulating unit 6 receive the OFDM signals independently, the OFDM symbol, which will be inputted into the storing unit 24 and the storing unit 34, has slippage in terms of time. The storing unit 24 and the storing unit 34 stores an N-th OFDM symbol, respectively. In other words, each of the storing unit 24 and the storing unit 34 stores the N-th OFDM symbol at a certain time.

Next, the timing adjusting unit 7 sends the same output timing pulse to both of the storing unit 24 and the storing unit 34. The storing unit 24 and the storing unit 34 output the N-th stored OFDM symbol to the FFT 22 and the FFT 32, respectively according to the output timing pulse in the same time. As a result, the FFT 22 and the FFT 32 can start the demodulating simultaneously from the head position of the same symbol. In other words, the processing timing of the FFT 22 and the processing timing of the FFT 32 are synchronized.

As a result, after the corresponding position of the data carrier between the first demodulating unit 5 and the second demodulating unit 6 is fixed, the combining/selecting unit 8 can perform the combining or selecting for every carrier.

In addition, the timing adjustment explained in FIG. 3 and FIG. 4 is an example, and another method may be used.

(Combining/Selecting Unit)

Using the first reliability value outputted by the waveform equalizer 34 and the second reliability value outputted by the waveform equalizer 33, carriers included in each of the first data carrier group and the second data carrier group are selected or combined. At this time, the combining/selecting unit 8 determines whether it should select or combine them according to an instruction that is set. The setting is performed by a program executed on a CPU or a register setting.

First, a case of selecting will now be explained.

The first demodulating unit 5 outputs the first data carrier group to the combining/selecting unit 8. The second demodulating unit 6 outputs the second data carrier group to the combining/selecting unit 8. Similarly, the first demodulating unit 5 outputs the first reliability value to the carrier of the first data carrier group to the combining/selecting unit 8. The second demodulating unit 6 outputs the second reliability value to the carrier of the second data carrier group to the combining/selecting unit 8. The combining/selecting unit 8 compares the first reliability value to the arbitrary carrier included in the first data carrier group with the second reliability value to the carrier included in the second carrier group corresponding thereto (the carrier positions in frequency axis are the same). The combining/selecting unit 8 selects the carrier whose value is larger (if the larger the value is, the higher reliability is meant), and then outputs the value.

Next, a case of combining will now be explained.

The combining/selecting unit 8 performs the maximum ratio combining to the carrier included in the first data carrier group and the carrier included in the second carrier group that corresponds thereto, based on the reliability value. The maximum ratio combining means calculating the average value according to the reliability value, and combining the carrier of the first data carrier group and the second data carrier group.

Figure 5:
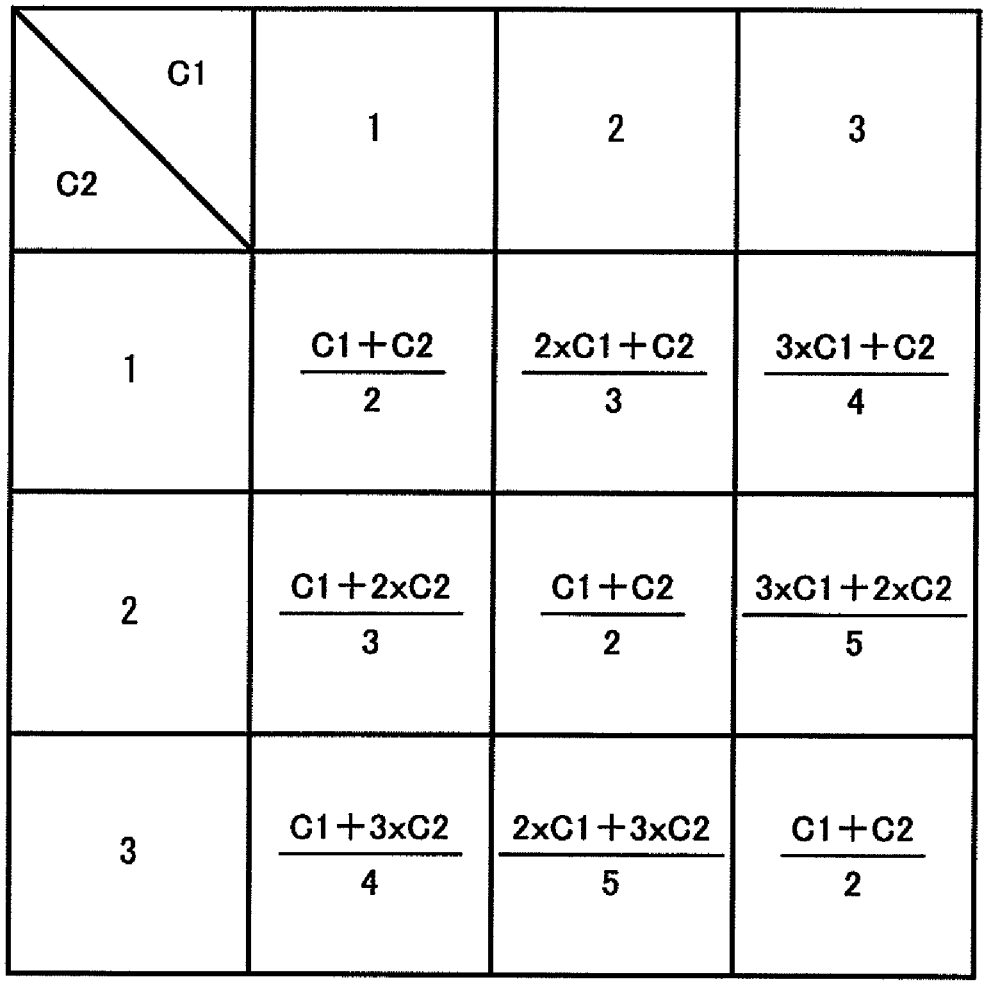
FIG. 5 indicates explanation of maximum ratio combining according to Embodiment 1 of the present invention.

It will now be explained referring to FIG. 5. FIG. 5 indicates explanation of maximum ratio combining according to Embodiment 1 of the present invention.

In FIG. 5, the reliability value has three steps of values from a value of "1" to a value of "3". A larger reliability value means higher reliability. In other words, the reliability value of "3" has higher reliability than the reliability value of "1". Moreover, the carrier included in the first carrier group is "C1", and the carrier included in the second carrier group is "C2".

The top row shows the reliability value of the carrier "C1" that is the first reliability value. The leftmost column shows the reliability value of the carrier "C2" that is the second reliability value.

As shown in FIG. 5, the combining/selecting unit 8 calculates the maximum ratio combining based on the reliability value, and outputs the result. For example, when the first reliability value of a carrier "C1" is a value of "2" and the second reliability value of a carrier "C2" is a value of "1", the combining/selecting unit 8 performs the calculation according to the equation of $((2*C1)+C2)/3$, and outputs it. When the reliability values differ, it is as indicated in FIG. 5.

Moreover, in addition to the maximum ratio combining, the combining/selecting unit 8 may perform equal ratio combining, which is combining the carriers included in the first carrier group and the second carrier group at a fixed ratio.

In addition, the combining/selecting unit 8 performs selecting and combining for every carrier.

Since the combining/selecting unit 8 performs selecting and combining for every carrier, the quality of reception in reception improves, and a bit error rate decreases. Thus, receiving performance improves.

The combining/selecting unit 8 outputs the result to the error correcting unit 9.

(Error Correcting Unit)

The error correcting unit 9 corrects an error of the digital data included in a demodulated carrier or a carrier.

The error correcting unit 9 performs Viterbi decoding, Reed-Solomon decoding etc., and detects and corrects the error of carrier or data. The digital data, to which the error correction is performed, is outputted as packet data regarding an image and/or an audio.

(Decoding Unit)

The decoding unit 13 is provided with only the first demodulating unit 5, and decodes the transmission control signal from the transmission control carrier (as shown in FIG. 2, a certain number of transmission control carriers is included in one symbol), which is outputted according to the FFT 22. Although the transmission control carrier is modulated with various modulating methods, in the ISDB-T standard, the transmission control carrier is modulated by the BPSK standard. The decoding unit 13 decodes the transmission control signal by a method corresponding to this modulating method.

The decoding unit 13 outputs the decoded transmission control signal to the control unit 10. In addition, the transmission control signal includes various information required for reception, such as a broadcast method, a modulating method, and an error correcting method.

(Detecting Unit)

The detecting unit 14 detects frame synchronization from the transmission control carrier that is the output of the FFT 22. In the ISDB-T standard, the OFDM signal has a unit called as a frame, and demodulating in the frame unit, error correction, and reproduction of image/audio are performed. As a standard of the processing border in the reception or the demodulating, the frame synchronization is necessary for the diversity receiving apparatus 1.

The detecting unit 14 outputs the detection result to the control unit 10.

(Control Unit)

The control unit 10 controls the entire of the diversity receiving apparatus 1. When the diversity receiving apparatus 1 receives the OFDM signal and demodulates it, it is necessary to know the information of the frame synchronization, which is the unit of processing, and the information of the broadcast method and demodulating method. After the control unit 10 judges the information, the diversity receiving apparatus 1 can perform the processing that corresponds to the broadcast method and demodulating method of the OFDM signal.

Based on the transmission control signal outputted by the decoding unit 13, the control unit 10 judges the broadcast method and the transmission method. Similarly, the control unit 10 judges the border of processing from the frame synchronization detected by the detecting unit 14. The control unit 10 notifies the receiving unit 4, the first demodulating unit 5, the second demodulating unit 6, the error correcting unit 9, etc of the judgment result.

(Image/Audio Decoding Unit)

An image/audio decoding unit 40 decodes packet data outputted by the error correcting unit 9 according to a predetermined method. The decoded packet data is reproduced as an image and an audio. Thus, a user can view and listen to them in a mobile terminal provided with the diversity receiving apparatus 1.

(Operation of Diversity Receiving Apparatus)

Next, operation of the diversity receiving apparatus 1 according to Embodiment 1 of the present invention will now be explained.

The first demodulating unit 5 demodulates the OFDM signals received by the antenna 2 and the tuner 11 (the demodulating is performed according to the operation of each element that is explained in the detail of each unit), and outputs the first carrier group. Similarly, the second demodulating unit 6 demodulates the OFDM signals received by the antenna 3 and the tuner 12, and outputs the second carrier group. The combining/selecting unit 8 combines or selects the first data carrier group included in the first carrier group and the second data carrier group included in the second carrier group.

Here, the decoding unit 13, with which only the first demodulating unit 5 is provided, decodes the transmission control signal. The detecting unit 14 detects the frame synchronization. Based on the decoding result, the control unit 10 judges the broadcast method and the demodulating method, and notifies the receiving unit 4, the first demodulating unit 5, the second demodulating unit 6, the error correcting unit 9, etc. of the demodulating processing that corresponds to the judgment result. Similarly, based on the frame synchronization, the control unit 10 notifies the receiving unit 4, the first demodulating unit 5, the second demodulating unit 6, the error correcting unit 9, etc. of the border of reception or demodulating. As a result, the diversity receiving apparatus 1 can appropriately perform the receiving that corresponded to the broadcast status transmitted to be sent.

At this time, since the control unit 10 can judge the broadcast method and the border of processing only based on the transmission control signal and frame synchronization outputted by the first demodulating unit 5 which is one of the plurality of the demodulating units, the judgment of the broadcast method or the processing border is not complicated.

In addition, regardless of increase for the number of branches, since the diversity receiving apparatus 1 according to Embodiment 1 of the present invention shown in FIG. 1 may be provided with one each of the decoding unit 13 and the detecting unit 14, it is possible to suppress the increase of the circuit scale.

As mentioned above, even though the reduction of the processing load and the suppression of the increase of the circuit scale are improved, the diversity receiving apparatus needs to perform the decoding of the transmission control signal and the frame synchronization.

In addition, in Embodiment 1 of the present invention, a case, where the number of branches is more than two, is explained. However, it is the same even when the number is more than three. In this case, the diversity receiving apparatus 1 is provided with a third demodulating unit (or a demodulating unit more than that) having the same structure of the second demodulating unit 6, which is not provided with the decoding unit 13 and the detecting unit 14.

Embodiment 2

Next, Embodiment 2 of the present invention will now be explained.

In Embodiment 2, regardless of the number of branches, both of the decoding unit 13 and the detecting unit 14 are provided.

First Example

Figure 6:
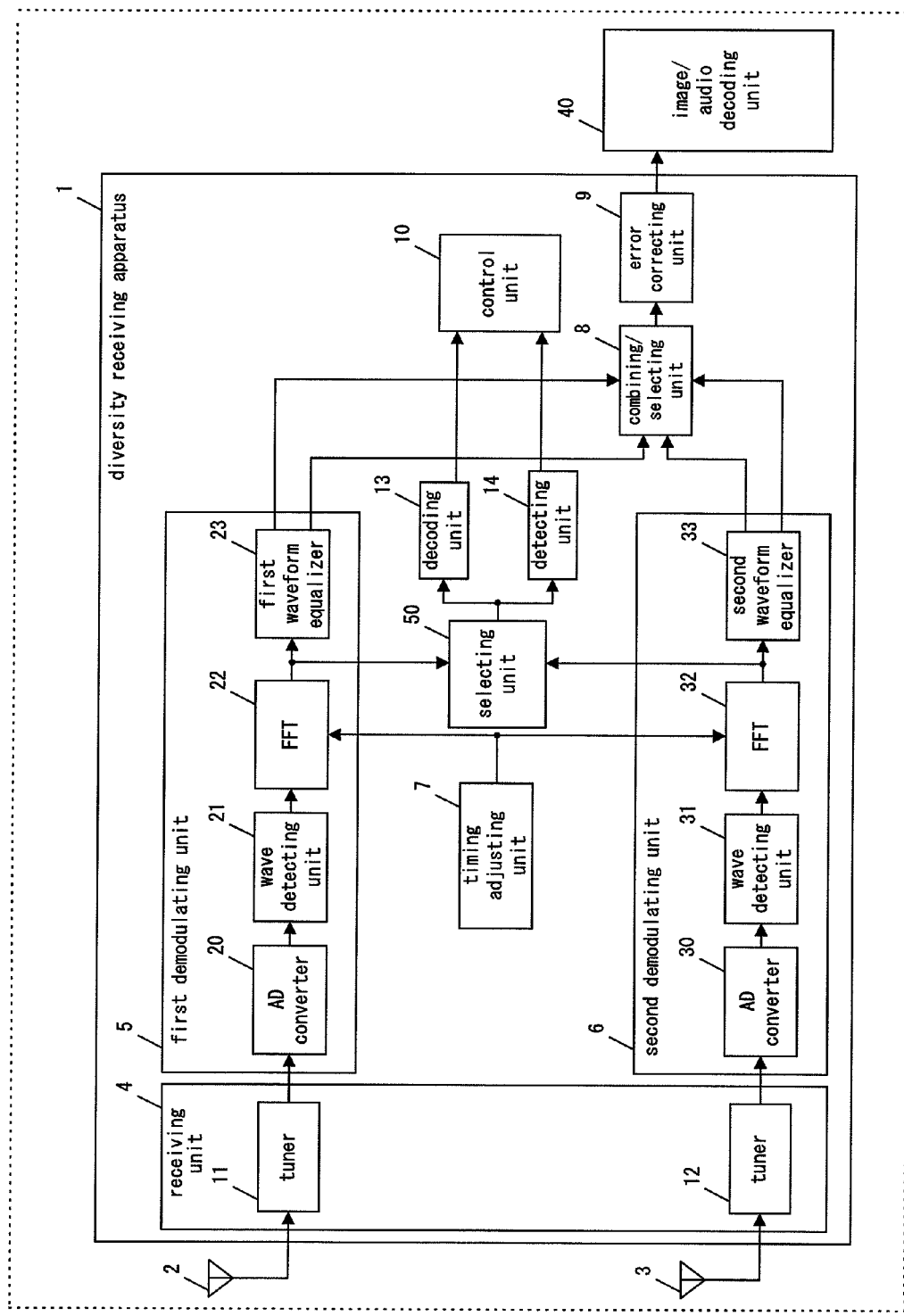
FIG. 6 is a block diagram of a diversity receiving apparatus according to Embodiment 2 of the present invention.

It will be explained referring to FIG. 6. FIG. 6 is a block diagram of a diversity receiving apparatus according to Embodiment 2 of the present invention.

An element, to which the same symbol as that of FIG. 1 is given, has the same function as that of Embodiment 1, which has been already explained.

The diversity receiving apparatus 1 shown in FIG. 6 is provided with a selecting unit 50 which selects either the first transmission control carrier outputted from the FFT 22 or the second transmission control carrier outputted from the FFT 32.

The selecting unit 50 selects either the first transmission control carrier or the second control carrier according to the predetermined setting. For example, the control unit 10 has a processor. The processor reads a predetermined program. With the setting of the program that is read, either the first transmission carrier or the second transmission carrier is selected.

Based on the transmission control carrier selected by the selecting unit 50, the decoding unit 13 decodes the transmission control signal, and outputs the decoding result to the control unit 10. The detecting unit 14 detects the frame synchronization, and outputs the detection result to the control unit 10. Detailed operation of the decoding unit 13 and the detecting unit 14 has been as explained in Embodiment 1 of the present invention.

Based on the received decoding result, the control unit 10 judges the broadcast method and the demodulating method, and notifies the receiving unit 4, the first demodulating unit 5, the second demodulating unit 6, the error correcting unit 9, etc. of the demodulating processing that corresponds to the judgment result. Similarly, based on the received frame synchronization, the control unit 10 notifies the receiving unit 4, the first demodulating unit 5, the second demodulating unit 6, the error correcting unit 9, etc. of the processing border of reception and demodulating. As a result, the diversity receiving apparatus 1 can perform the reception that corresponds to the broadcast state to be sent appropriately.

In the diversity receiving apparatus 1 shown in FIG. 6, one of the plurality of the transmission control carriers outputted from the plurality of demodulating units is selected. The shared and provided decoding unit 13 and the detecting unit 14 perform decoding of the transmission control signal and detection of the frame synchronization. For this reason, even if the number of branches increases because of the diversity receiving, it is possible to suppress the increase of the circuit scale.

Moreover, since the control unit 10 can judge the broadcast method and the processing border only based on one transmission control signal and frame synchronization, it is possible to make the judgment in the broadcast method and processing border less complicated.

In addition, the diversity receiving for every carrier in the combining/selecting unit 8, the error correction in the error correcting unit 9, and the processing in the image/audio decoding unit 40 are similar to those explained in Embodiment 1 of the present invention.

The Second Example

Figure 7:
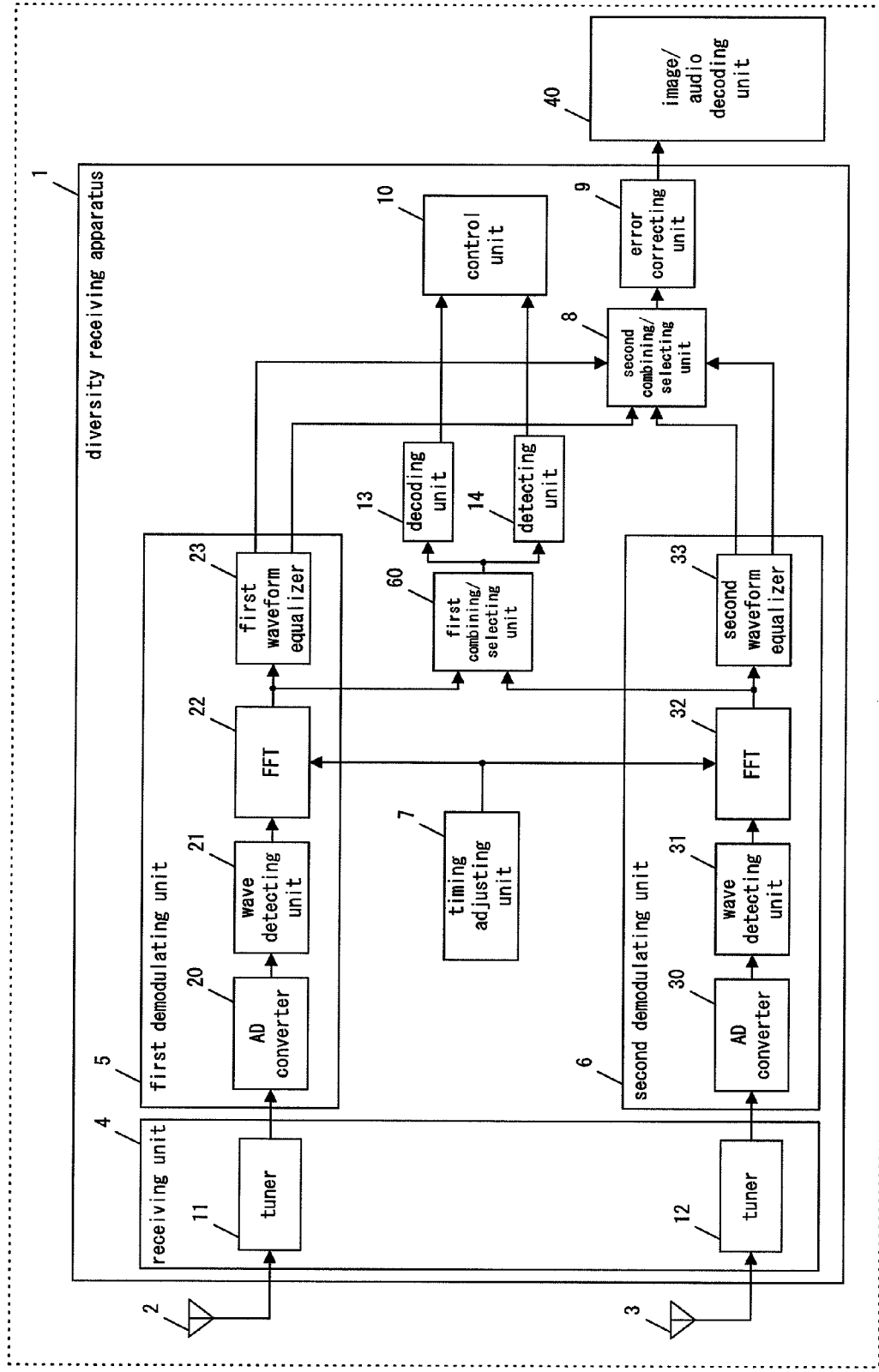
FIG. 7 is a block diagram of a diversity receiving apparatus according to Embodiment 2 of the present invention.

Next, referring to FIG. 7, another aspect of a diversity receiving apparatus will now be explained. FIG. 7 is a block diagram of a diversity receiving apparatus according to Embodiment 2 of the present invention.

An element, to which the same symbol as that of FIG. 1 is given, has the same function as that of Embodiment 1, which has been already explained. In order to distinguish from the first combining/selecting unit 60, the word of "second" is given to the second combining/selecting unit 8; however, it has the same function as that of the combining/selecting unit 8, which has been explained in Embodiment 1 of the present invention. In other words, the second combining/selecting unit 8 combines or selects the first data carrier and the second data carrier based on the first reliability value and the second reliability value.

The first combining/selecting unit 60 combines or selects the first transmission control carrier outputted from the FFT 22, and the second transmission control carrier outputted from the FFT 32, and outputs it to the decoding unit 13 and the detecting unit 14. None of the plurality of the demodulating units is provided with the decoding unit 13 and the detecting unit 14. One set of the decoding unit 13 and the detecting unit 14 is shared.

The first combining/selecting unit 60 combines the transmission control carrier and the second transmission control carrier at the predetermined ratio. Alternatively, the first combining/selecting unit 60 selects either the first transmission control carrier or the second transmission control carrier according to the predetermined setting. As a result, only one transmission control carrier will be used by the decoding unit 13 and the detecting unit 14.

In addition, the first combining/selecting unit 60 may combine or select a signal, which has performed symbol delay wave detecting separately in each carrier group.

The decoding unit 13 decodes the transmission control signal based on the transmission control carrier that is combined or selected by the first combining/selecting unit 60. The decoding unit 13 outputs the decoding result to the control unit 10. Based on the transmission control carrier that is combined or selected by the first combining/selecting unit 60, the detecting unit 14 detects the frame synchronization and outputs the detection result to the control unit 10. In other words, the control unit 10 needs to deal with only one each of decoding result and detection result, even if there are a plurality of branches.

Based on the received decoding result, the control unit 10 judges the broadcast method and the demodulating method, and notifies the receiving unit 4, the first demodulating unit 5, the second demodulating unit 6, the error correcting unit 9, etc. of the demodulating processing that corresponds to the judgment result. Similarly, based on the received frame synchronization, the control unit 10 notifies the receiving unit 4, a first demodulating unit 5, the second demodulating unit 6, the error correcting unit 9, etc. of the border of reception or demodulating. As a result, the diversity receiving apparatus 1 can perform the reception which corresponds to the broadcast state to be sent appropriately.

In the diversity receiving apparatus 1 shown in FIG. 7, a plurality of the transmission control carriers, which are outputted by the plurality of demodulating units, is combined or selected. Using the combined or selected transmission control carrier, the shared decoding unit 13 and the detecting unit 14 decode the transmission control signal, and detect the frame synchronization. For this reason, even though the number of branches, which are necessary for the diversity receiving, increases, the number of the shared decoding unit 13 and detecting unit 14 does not increase. Thus, it is possible to suppress the increase of the circuit scale for the entire of diversity receiving apparatus 1.

Moreover, since the control unit 10 can judge the broadcast method and the border of processing only based on one transmission control signal and frame synchronization, thereby making the processing less complicated and easier.

The Third Example

Figure 8:
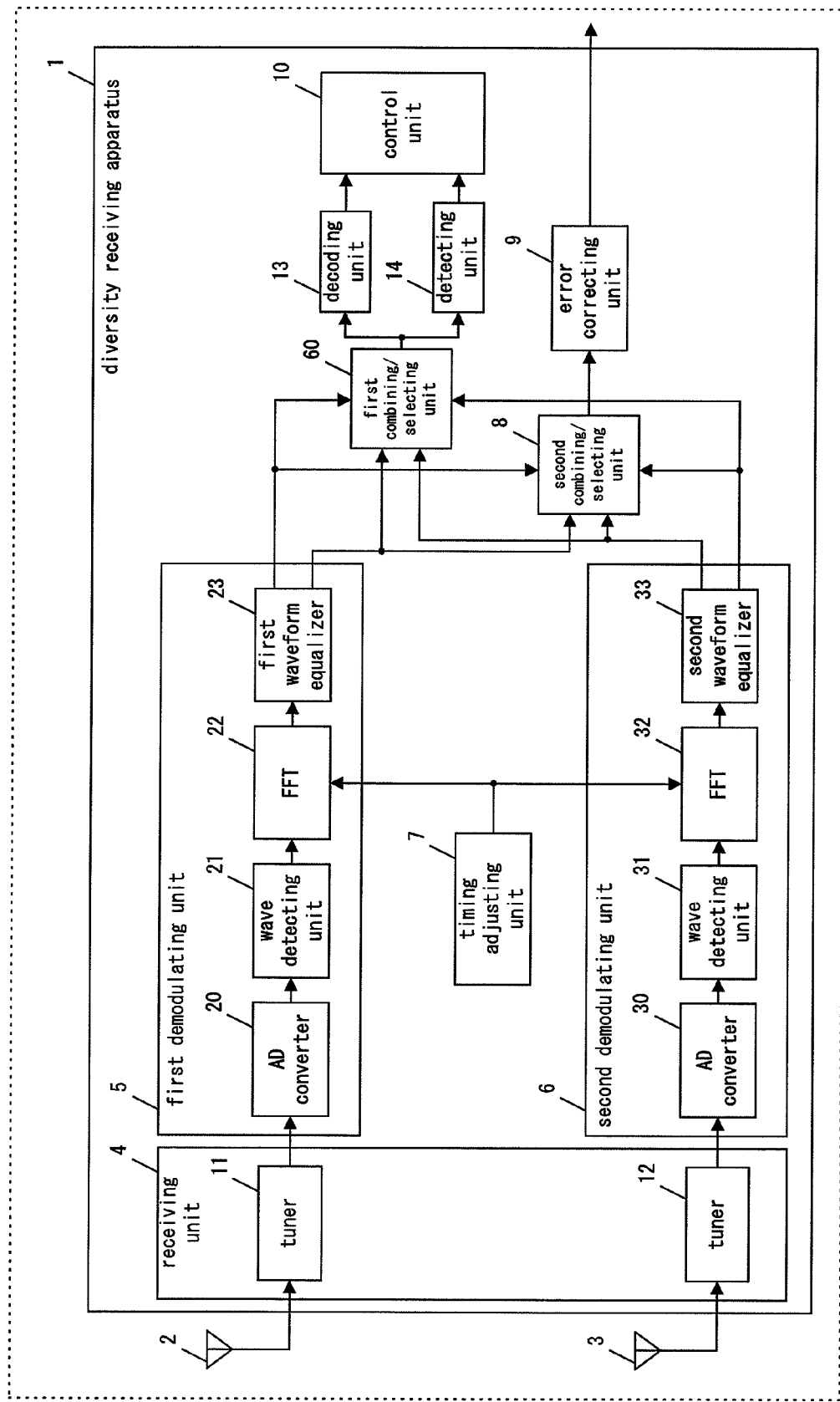
FIG. 8 is a block diagram of a diversity receiving apparatus according to Embodiment 2 of the present invention.

Next, referring to FIG. 8, another aspect of a diversity receiving apparatus 1 will now be explained. FIG. 8 is a block diagram of a diversity receiving apparatus according to Embodiment 2 of the present invention.

An element, to which the same symbol as that of FIG. 1 is given, has the same function as that of Embodiment 1, which has been already explained. In order to distinguish from the first combining/selecting unit 60, the word of "second" is given to the second combining/selecting unit 8; however, it has the same function as that of the combining/selecting unit 8, which has been explained in Embodiment 1 of the present invention. In other words, the second combining/selecting unit 8 combines or selects the first data carrier and the second data carrier based on the first reliability value and the second reliability value.

Dissimilar to FIG. 7, the first reliability value and the first carrier group from the first waveform equalizer 23, and the second reliability value and the second carrier group from the second waveform equalizer 33 are inputted in the first combining/selecting unit 60. In other words, dissimilar to the diversity receiving apparatus 1 shown in FIG. 7, in the diversity receiving apparatus 1 shown in FIG. 8, the first combining/selecting unit 60 combines or selects the first transmission control carrier and the second transmission control carrier by using the first reliability value and the second reliability value.

In addition, the first waveform equalizer 23 calculates the first reliability value with respect to both of the first data carrier and the first transmission control carrier, and outputs it. Similarly, the second waveform equalizer 33 calculates the second reliability value with respect to both of the second data carrier and the second transmission control carrier. As a result, the first combining/selecting unit 60 can combine or select the first transmission control carrier and the second transmission control carrier by using the first reliability value and the second reliability value.

The first combining/selecting unit 60 combines or selects the first transmission control carrier and the second transmission control carrier based on the values of the first reliability value and the second reliability value.

When the selecting is performed, the first combining/selecting unit 60 compares the first reliability value with the second reliability value, and selects the transmission control carrier corresponding to a reliability value whose value is larger. For example, when the first reliability value is larger than the second reliability value, the first combining/selecting unit 60 selects and outputs the first transmission control carrier.

When the combining is performed, the first combining/selecting unit 60 performs combining at a predetermined ratio, by the equal ratio combining, or by the maximum ratio combining according to the reliability value, on the transmission control carrier. The maximum ratio combining is performed by the same processing as the maximum ratio combining of the data carrier explained referring to FIG. 5.

FIG. 9 indicates explanation of maximum ratio combining for a transmission control carrier according to Embodiment 2 of the present invention. The first transmission control carrier is "T1". The second transmission control carrier is "T2".

In FIG. 9, the reliability value has three levels of values from the value "1" to the value "3". A larger reliability value means higher reliability. In other words, the reliability value of "3" has higher reliability than the reliability value of "1".

The top row shows the first reliability value that is the reliability value of the first transmission control carrier "T1". The leftmost column shows the second reliability value that is the reliability value of the second transmission control carrier "T2".

As shown in FIG. 9, the first combining/selecting unit 60 calculates the maximum ratio combining based on a reliability value, and outputs the result. For example, the first reliability value of a career "T1" is a value "2", and when the second reliability value of a career "T2" is a value "1", the first combining/selecting unit 60 performs the calculation according to the equation of $(2 \times T1+T2)/3$, and outputs it. For example, when the first reliability value of the carrier "T1" is the value of "2" and the second reliability value of the carrier "T2" is the value of "1", the first combining/selecting unit 60 performs the calculation according to the equation of $((2*T1)+T2)/3$, and outputs it. When the reliability values differ, it is as indicated in FIG. 9.

In addition, since the processing timing of the carrier in the demodulating of the FFT 22 and the FFT 32 is synchronized by the processing of the timing adjusting unit 7, in the combining/selecting unit 60, the first transmission control carrier and the second transmission control carrier, which are corresponded to the given time, are inputted into the given time zone.

When the first combining/selecting unit 60 combines or selects, the quality of reception in reception of the transmission control carrier becomes higher. In other words, by the combining or selecting according to the reliability value, the C/N ratio of the transmission control carrier, which may be the output of the first combining/selecting unit 60, can be higher than the C/N ratio of the transmission control carrier, which has not inputted into the first combining/selecting unit 60 yet. Especially, when the combining is performed, the carrier with the correlation is combined to the noise of the correlation absence, and then the C/N ratio can be improved to 3 dB, at least.

Thus, since the transmission control carrier (in addition, there is only one in the entire of the diversity receiving apparatus 1) whose C/N ratio is improved is inputted into the decoding unit 13 and the detecting unit 14, it is possible to perform the decoding of the transmission control signal with very high accuracy and the detection of the frame synchronization. Moreover, since there is only one each detection result of the transmission control signal and the frame synchronization, which is received by the control unit 10, it is possible to reduce the load of processing using the results. Of course, even though the number of branches increases, one set of the decoding unit 13 and the detecting unit 14 is shared in the diversity receiving apparatus 1, thereby the circuit scale is reduced.

As mentioned above, in addition to reduction of circuit scale, or the reduction of the processing load in the control unit 10, it is possible to realize improving the decoding accuracy of the transmission control signal and the detection accuracy of the frame synchronization. As a result, it is possible to improve the quality of reception. Especially, comparing to the conventional diversity receiving apparatus, since the quality of reception in the diversity receiving for every carrier, which is performed in the second combining/selecting unit 8, is improved, thereby it is possible to realize further improving the quality of reception.

In addition, based on the received decoding result, the control unit 10 judges the broadcast method and the demodulating method, and notifies the receiving unit 4, the first demodulating unit 5, the second demodulating unit 6, the error correcting unit 9, etc. of the demodulating processing that deals with the judgment result. Similarly, based on the received frame synchronization, the control unit 10 notifies the receiving unit 4, the first demodulating unit 5, the second demodulating unit 6, the error correcting unit 9, etc. of the processing border of the reception or demodulating. As a result, the diversity receiving apparatus 1 can perform receiving processing that corresponds to the broadcast state to be transmitted appropriately.

Embodiment 3

Next, referring to FIG. 10, Embodiment 3 will now be explained.

Figure 10:
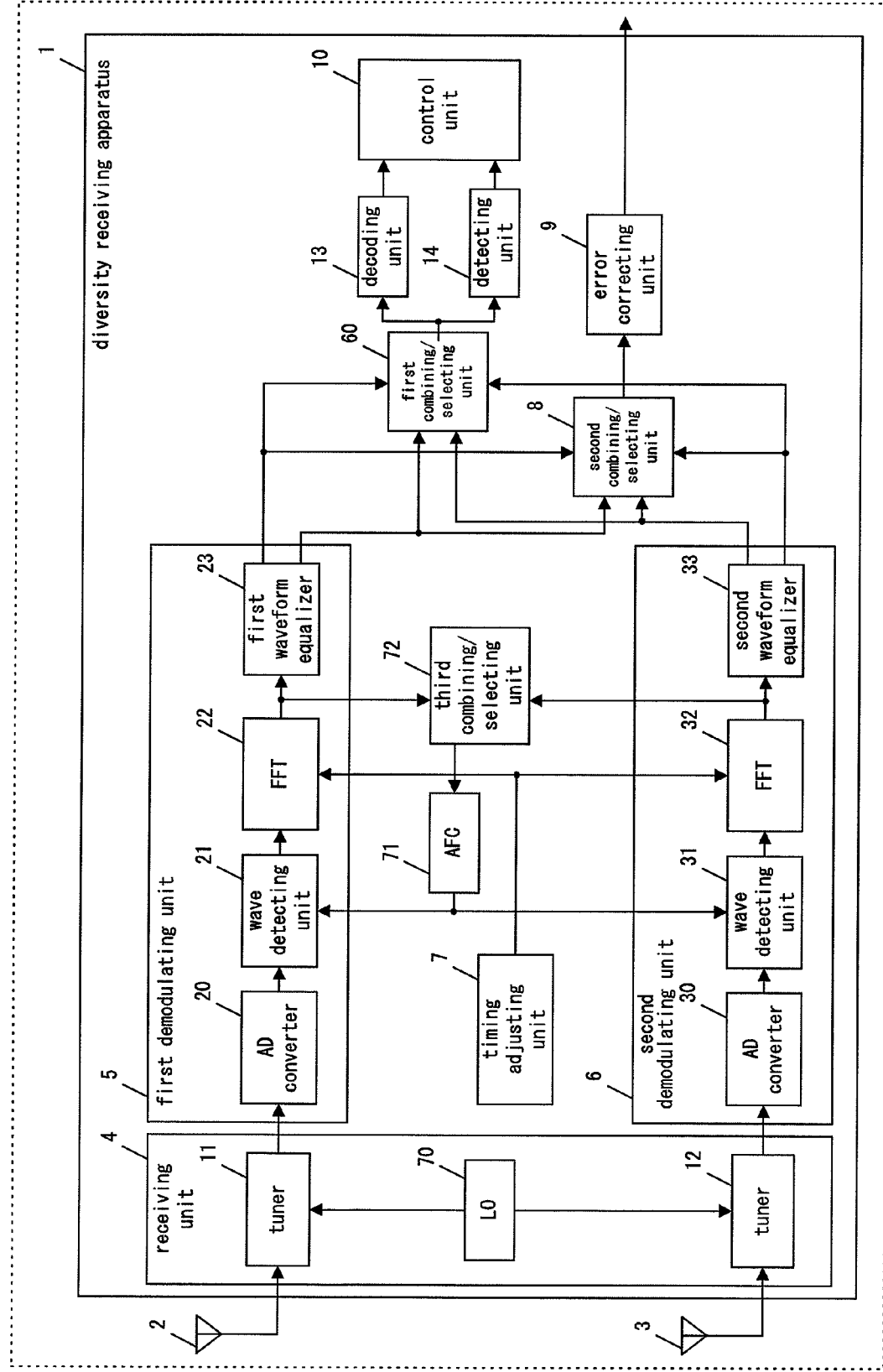
FIG. 10 is a block diagram of a diversity receiving apparatus according to Embodiment 3 of the present invention.

FIG. 10 is a block diagram of a diversity receiving apparatus according to Embodiment 3 of the present invention.

The diversity receiving apparatuses 1 shown in FIG. 10 is provided with a local oscillator (shown with the word of "LO" in Figs.) 70, and an auto frequency control (shown with the word of "AFC" in Figs.) 71 and a third combining/selecting unit 72. An element, to which the same symbol as that of FIG. 8 is given, has the same function.

In the diversity receiving apparatus 1 of Embodiment 3, even when the number of branches increases, an element correcting the amount of the time frequency off-set, which is the difference between the frequency generated by the local oscillator 70 setting the tuners 11 and 12 and the channel frequency of the OFDM signal to be sent, is shared.

The local oscillator 70 outputs the oscillating frequency corresponding to the selected channel to the tuners 11 and 12. The tuners 11 and 12 select a channel based on the oscillating frequency, and output a desired OFDM signal. The OFDM signal is outputted to the first demodulating unit 5 and the second demodulating unit 6 as a receiving signal. Thus, by sharing the local oscillator 70, the amount of time frequency off-set generated in each of the first demodulating unit 5 and the second demodulating unit 6 becomes the same.

The third combining/selecting unit 72 combines or selects the first carrier group from the FFT 22 and the second carrier group from the FFT 32, and outputs the group to the AFC 71. The AFC 71 detects the amount of time frequency off-set using the output from the third combining/selecting unit 72. The AFC 71 notifies the wave detecting units 21 and 31 of the detected amount of time frequency off-set. The wave detecting units 21 and 31 can accurately perform the wave detecting orthogonally to the receiving signal using the notified amount of time frequency off-set.

In addition, the third combining/selecting unit 72 may combine or select the signal, to which the symbol delay detecting is performed separately for each carrier group.

Since the local oscillator 70 and the AFC 71 are shared regardless of the increase of the number of branches, it is possible to reduce the circuit scale and the power consumption.

Moreover, in FIG. 10, an output signal of the third combining/selecting unit 72 is inputted into the AFC 71. Alternatively, to the AFC 71, the output signal of the first combining/selecting unit 60 or the second combining/selecting unit 8 may be inputted.

Embodiment 4

Next, Embodiment 4 will now be explained.

The diversity receiving apparatus of Embodiment 4 removes a branch in inappropriate status among the plurality of branches from an object of the diversity receiving apparatus. In addition, other processing suitable for the branch in the inappropriate status is performed.

Figure 11:
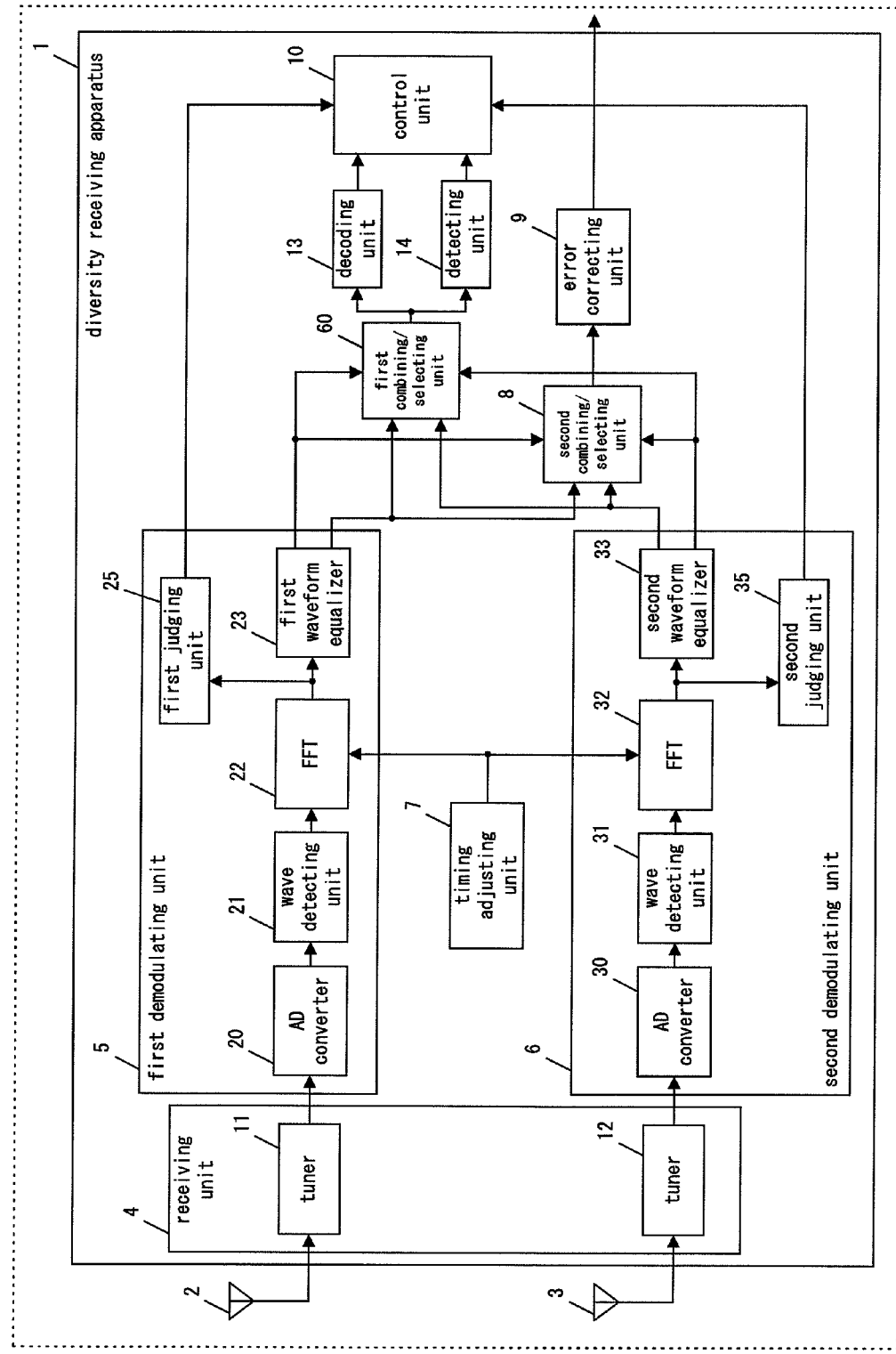
FIG. 11 is a block diagram of a diversity receiving apparatus according to Embodiment 4 of the present invention.

FIG. 11 is a block diagram of a diversity receiving apparatus according to Embodiment 4 of the present invention.

In the diversity receiving apparatus shown in FIG. 11, the first demodulating unit 5 is provided with a first judging unit 25 operable to judge reception status in the first demodulating unit. The second demodulating unit 6 is provided with a second judging unit 35 operable to judge reception status in the second demodulating unit 6. The first judging unit 25 and the second judging unit 35 output judgment results to the control unit 10, respectively. According to the judgment result, the control unit 10 controls at least one of the first demodulating unit 5, the second demodulating unit 6, the first combining/selecting unit 60, and the second combining/selecting units 8.

The first judging unit 25 judges the reception status of the first demodulating unit 5 as appropriate or inappropriate, and outputs the judgment result to the control unit 10. Similarly, the second judging unit 35 judges the reception status of the second demodulating unit 6 as appropriate or inappropriate, and outputs the judgment result to the control unit 10.

Here, the word of "appropriate" means that a branch can be used in the diversity receiving. The word of "inappropriate" means that a branch can not be used in the diversity receiving.

First, the judgment of reception status is explained.

(The First Example of Judgment for Reception Status)

The first judging unit 25 judges reception status based on at least one of the amplitude value or the variation value of the pilot carrier included in the first carrier group (hereinafter, it is called as a "first pilot carrier"), which is outputted by the FFT 22. Similarly, the second judging unit 35 judges reception status based on at least one of the amplitude value or the variation value of the pilot carrier included in the second carrier group (hereinafter, it is called as a "second pilot carrier"), which is outputted by the FFT 32.

Figure 12:
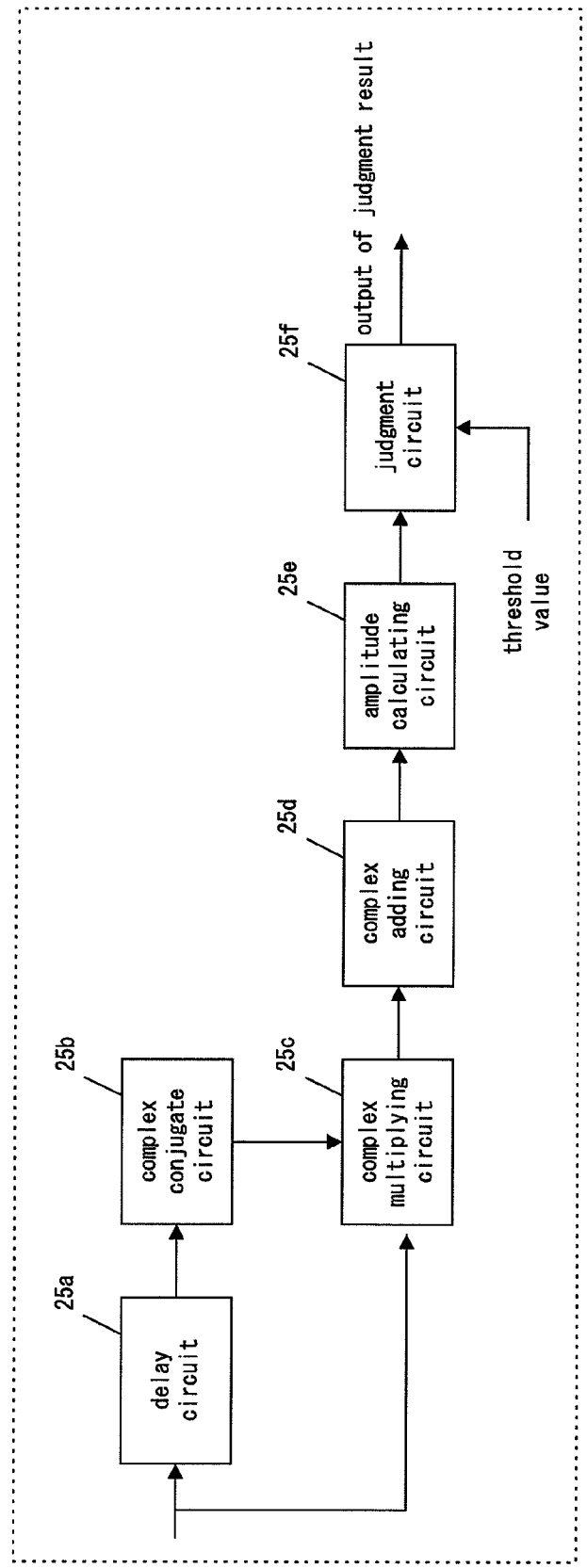
FIG. 12 is a block diagram showing the inside of a first judging unit according to Embodiment 4 of the present invention.

Referring to FIG. 12, an example of judgment of reception status in the first judging unit 25 and the second judging unit 35 is explained. FIG. 12 is a block diagram showing the inside of a first judging unit according to Embodiment 4 of the present invention. In addition, the internal block figure of the second judging unit 35 is the same as FIG. 12.

The output of the FFT 22 is inputted into a delay circuit 25a and a complex multiplying circuit 25c. The delay circuit 25a makes the output of the FFT 22 be delayed by four symbols, and outputs it. A complex conjugate circuit 25b calculates complex conjugate of the output of the delay circuit 25a. The complex multiplying circuit 25c multiplies the output of the FFT 11 and the output of the complex conjugate circuit 25b. Here, since a signal to be modulated by the pilot carrier has the characteristics of fixed phase and fixed amplitude, output vector of the complex multiplying circuit 25c has the same direction. A complex adding circuit 25d performs adding calculation based on the analog signal for the multiplied pilot carrier throughout the entire of the symbol of the OFDM signal.

An amplitude calculating circuit 25e calculates a size of a vector of a pilot carrier using the output of the complex adding circuit 25d. The size of the vector shows the amplitude value of the first pilot carrier included in the first carrier group.

A judgment circuit 25f compares the amplitude value with a predetermined threshold value. When the amplitude value is larger than the predetermined threshold value, the judgment circuit 25f judges that the reception status is appropriate. When the amplitude value is smaller than the predetermined threshold value, the judgment circuit 25f judges that the reception status is inappropriate.

(The Second Example of Judgment for Reception Status)

Figure 13:
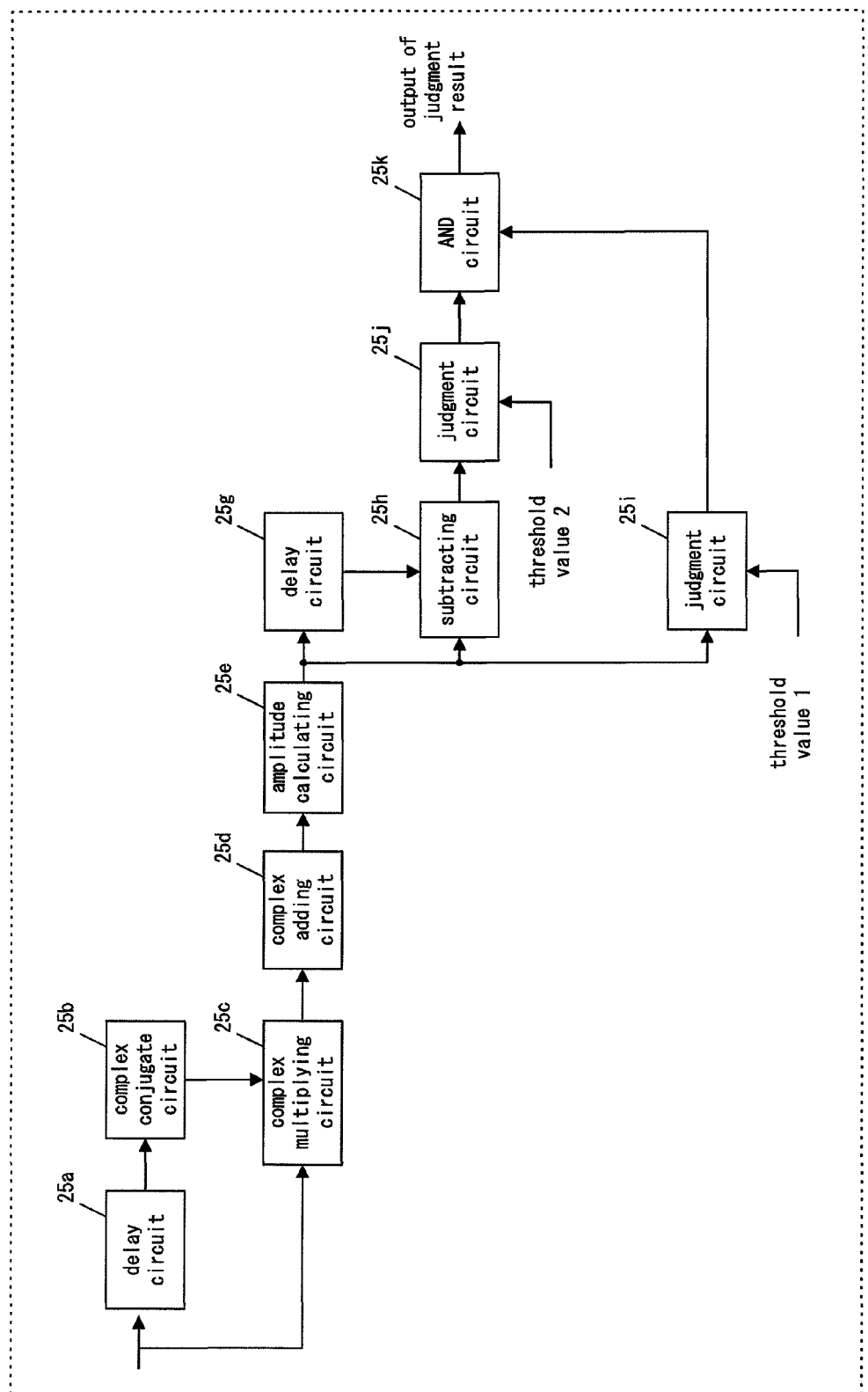
FIG. 13 is a block diagram showing the inside of a first judging unit according to Embodiment 4 of the present invention.

Next, referring to FIG. 13, other methods of the judgment of the reception status is explained. A judging unit shown in FIG. 13 calculates a variation value which indicates change status of the amplitude value.

FIG. 13 is a block diagram showing inside of a first judging unit according to Embodiment 4 of the present invention. In addition, the internal block of the second judging unit 35 is the same as FIG. 13.

An element, to which the same symbol as that of FIG. 12 is given, has the same function. In other words, the output of the FFT 22 is processed by the elements from the delay circuit 25a and to the amplitude calculating circuit 25e. By the processing, the amplitude value of the first pilot carrier is calculated.

A delay circuit 25g makes the output of the amplitude calculating circuit 25e be delayed by the unit of symbol. A subtracting circuit 25h calculates the difference between the output of the amplitude calculating circuit 25e and the output of the delay circuit 25g. In other words, it is possible to acquire the difference between the amplitude values of the current first pilot carrier and the previous first pilot carrier, which is one symbol behind of the current first pilot carrier. This is equivalent to the variation value of the amplitude value.

A judgment circuit 25i compares the amplitude value of the first pilot carrier included in the current symbol with the predetermined threshold value 1. In other words, the judgment circuit 25i judges whether the reception status is appropriate or inappropriate according to the amplitude value of the first pilot carrier included in the current symbol.

Furthermore, a judgment circuit 25j compares the output of the subtracting circuit, which is the difference value between the amplitude values of the current symbol and the first pilot carrier included in the previous symbol, with the threshold value 2. By comparing the difference value with the threshold value 2, it is possible to judge the change of the reception status.

In other words, it is possible to know the reception status in the judgment circuit 25i. In addition, it is possible to know the change of the reception status.

When both of the results of the judgment circuit 25i and the judgment circuit 25j are appropriate, an AND circuit 25k outputs a judgment result of which the reception status is appropriate. For example, even when the reception status changes rapidly caused by phasing, as long as the change of the reception status in the branch is appropriately known, it is possible to judge whether the reception status is appropriate or inappropriate by the judging unit shown in FIG. 13.

For example, even when the reception status deteriorates because of the occurrence of phasing while the current reception status is appropriate, it is possible to judge that the reception status is inappropriate. Thus, the reception status can be judged more accurately.

(The Third Example of Judgment for Reception Status)

Figure 14:
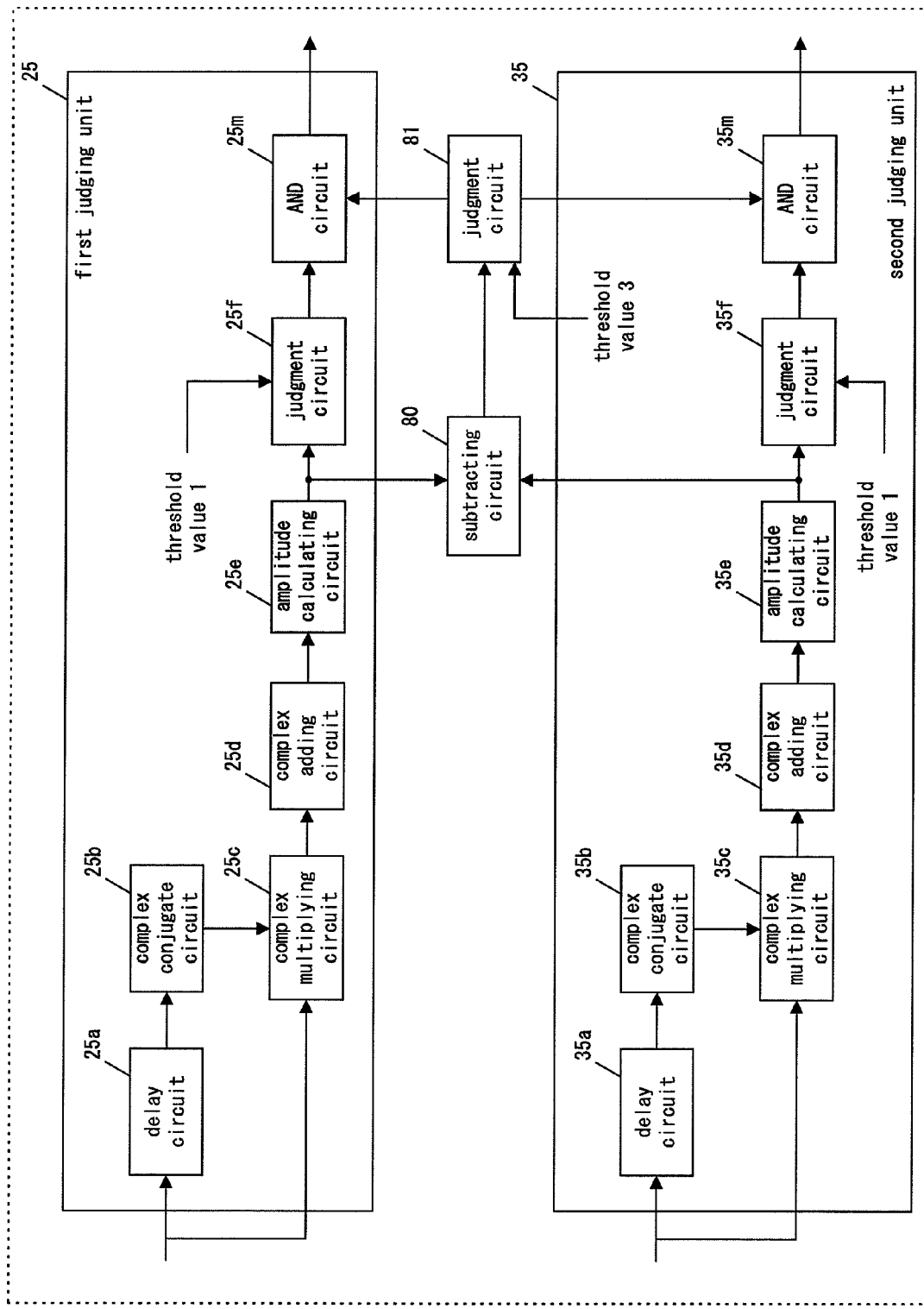
FIG. 14 is a block diagram of a first judging unit and a second judging unit according to Embodiment 4 of the present invention.

Next, referring to FIG. 14, other methods of the judgment of the reception status is explained. The judging unit shown in FIG. 14 judges the reception status of each branch based on the difference of the reception status for every branch.

FIG. 14 is a block diagram of a first judging unit and a second judging unit according to Embodiment 4 of the present invention.

In addition to the first judging unit 25 and the second judging unit 35, a subtracting circuit 80 operable to know the difference between the first demodulating unit 5 and the second demodulating unit 6, and a judgment circuit 81 operable to judge based on the difference are provided.

The subtracting circuit 80 calculates the difference between the amplitude calculating circuit 25e and the amplitude calculating circuit 35e. This difference means the difference between the reception levels of the received pilot carrier in the first demodulating unit 5 and the second demodulating unit 6. The judgment circuit 81 compares the subtraction result in the subtracting circuit 80 with the predetermined threshold value 3, performs the judgment, and then outputs the judgment result to AND circuits 25m and 35m. Since the judgment circuit 81 compares the difference of the reception levels between the two branches calculated by the subtracting circuit 80 with the predetermined threshold value 3, the judgment circuit 81 can judge the size of the difference for the reception levels between the two branches. Furthermore, it is possible to judge which branch has poorer reception status.

For example, when the reception level of the branch including the first demodulating unit 5 is better than the reception level of the branch including the second demodulating unit 6, and the difference is equal to or more than the threshold value 3, the judgment circuit 81 outputs judgment result indicating appropriate to the AND circuit 25m, and the judgment result indicating inappropriate to the AND circuit 35m. As a result, when the amplitude of the pilot carrier in a second demodulating unit 6 is more than certain level while the difference of the reception level in the first demodulating unit 5 is too large, the reception in the branch including the second demodulating unit 6 is judged inappropriate.

(The Fourth Example of Judgment for Reception Status)

Figure 15:
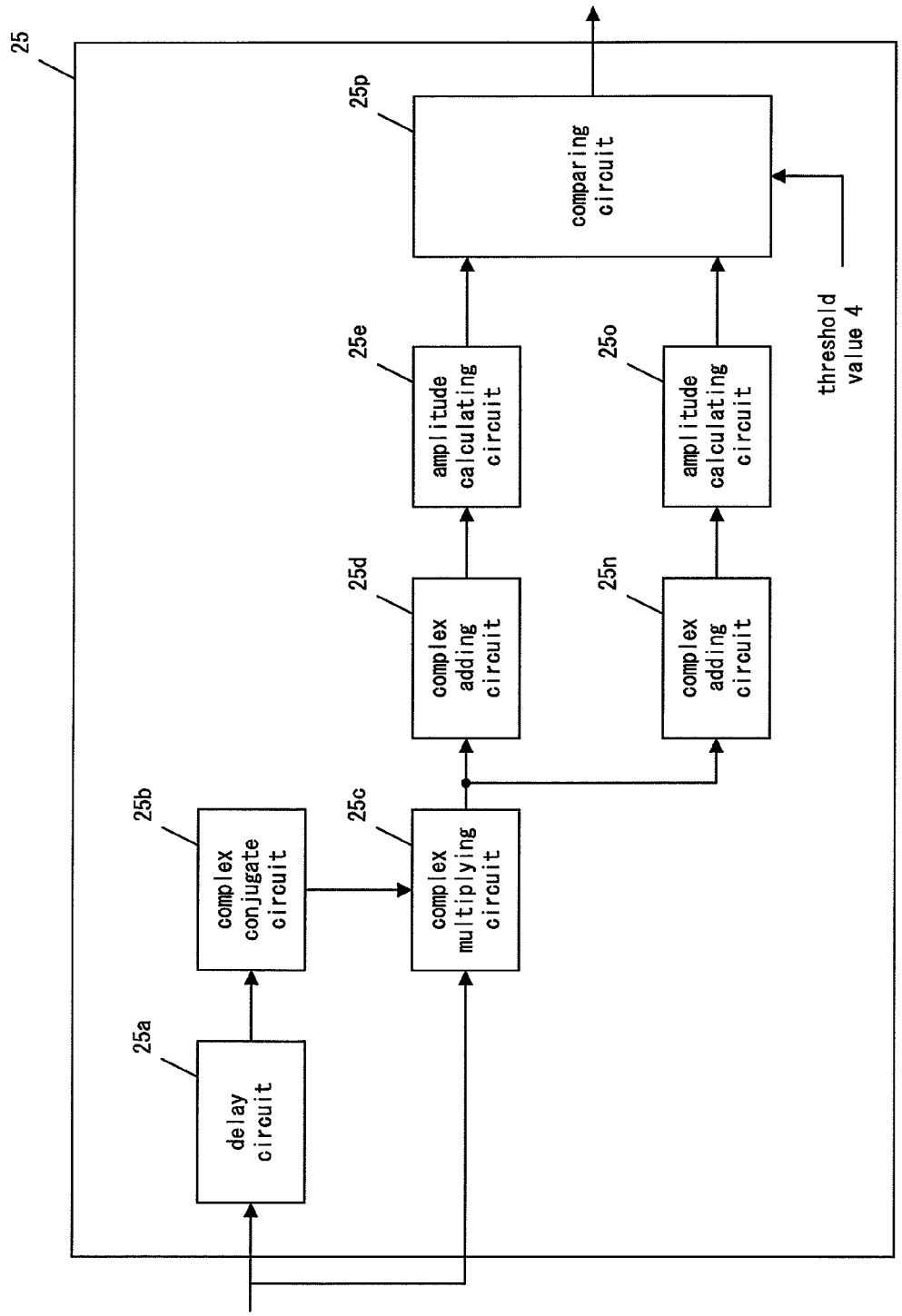
FIG. 15 is a block diagram of a first judging unit according to Embodiment 4 of the present invention.

Next, referring to FIG. 15, other methods of the judgment of the reception status is explained. The judging unit shown in FIG. 15 judges the reception status of the concerned branch by comparing the amplitude of the data carrier included in the demodulated carrier group and the amplitude of the pilot carrier.

FIG. 15 is a block diagram of a first judging unit according to Embodiment 4 of the present invention. An element, to which the same symbol as that of FIG. 12 is given, has the same function that is explained in FIG. 12.

The output of the complex multiplying circuit 25c is inputted into both of the complex adding circuit 25d and the complex adding circuit 25n. The complex adding circuit 25d performs complex adding of the pilot carrier in the carrier group. The amplitude calculating circuit 25e calculates the amplitude of the pilot carrier.

On the other hand, the complex adding circuit 25n performs the complex adding of the data carrier in the carrier group. The amplitude calculating circuit 25o calculates the amplitude of the data carrier.

Since the pilot carrier has the same amplitude and the same phase ideally, the output of the complex adding circuit 25d will have a fixed size with progress of time. However, since the amplitude and phase of the pilot carrier tend to be random when the reception status is poor, the size of the output of the complex adding circuit 25d will be smaller with the progress of time.

On the other hand, since the amplitude and the phase of the data carrier are random, by performing adding in vector for the complex adding circuit 25n, the value for the output of the complex adding circuit 25n will be the value of "0" with the progress of time.

A comparing circuit 25p compares the amplitude value of the pilot carrier included in the carrier group with the amplitude value of the data carrier. Furthermore, the comparing circuit 25p compares the difference value between the amplitude value of the pilot carrier and the amplitude value of the data carrier with the threshold value 4.

When the reception status is good, the amplitude value of the pilot carrier will be larger than the amplitude value of the data carrier sufficiently. For this reason, when the amplitude value of the pilot carrier is larger than the amplitude value of the data carrier, and the difference is larger than the threshold value 4, which is predetermined, the comparing unit 25p judges that the reception status is appropriate.

In addition, although the four examples of the judgment for the reception status are explained, the present invention is not limited to them.

(Control)

As mentioned above, after receiving the judgment result for the reception status of the branch, the control unit 10 controls at least one of the first demodulating unit 5, the second demodulating unit 6, the first combining/selecting unit 60, the second combining/selecting unit 8, and the receiving units 4.

First, the control unit 10 makes the carrier group demodulated by the demodulating unit included in the branch, which is judged as inappropriate, be unused in the first combining/selecting unit 60 and the second combining/selecting unit 8. The control is performed because the data carrier and the transmission control carrier included in the carrier group, which is judged as inappropriate, has the poor reception status, and it is better to make them be unused for combining and selecting. In addition, "unused in the combining" includes the processing broadly, such as not using the concerned carrier at the time of combining, performing combining calculation for the concerned carrier as the value of "0", performing the combining calculation by making the value of the concerned carrier be really small, and performing the combining calculation by making the level of contribution of the reliability value corresponding to the concerned carrier. Naturally, when the selecting is performed in the combining/selecting unit, the carrier outputted by the demodulating unit, which has judged inappropriate, will not be selected.

In short, the control unit 10 performs control in order to make the level of contribution for the carrier outputted from the demodulating unit, which has judged inappropriate.

Next, the control unit 10 performs control in order to reduce the power consumption of the demodulating unit, which is judged inappropriate, in the first demodulating unit 5 and the second demodulating unit 6.

For example, a case where reception by the first demodulating unit 5 is judged inappropriate is considered.

The control unit 10 initializes the storing value stored in the storing unit that is included in the first demodulating unit 5. It is because if the storing value in the demodulating unit, which is judged inappropriate, is as it is, when the status changes from inappropriate to appropriate (or when the status is forced to be appropriate from inappropriate), the value of the processing result may become unsuitable. By the initialization, it is possible to acquire the demodulating result promptly and suitably after the status has resumed.

In addition, when each of the first demodulating unit 5 and the second demodulating unit 6 is provided with the AFC unit operable to correct the amount of time frequency off-set to the reception frequency, it is suitable that the amount of time frequency off-set is not initialized at the time of initialization, and the value of the amount of time frequency off-set is held as it is. The amount of time frequency off-set is often held as the fixed value regardless of the progress of time. For this reason, it is suitable that the value of the stored amount of off-set, which is held as it is, is used after the status has resumed when concerning the efficiency, instead of performing the initialization and re-calculation after the status has resumed.

After the initialization is completed, the control unit 10 makes the clock signal, which is supplied to the first demodulating unit 5, be reduced or stopped. Since the reception status is judged inappropriate, the demodulating result of the first demodulating unit 5 is unnecessary in the diversity receiving apparatus 1.

When the clock signal is stopped, the operation of circuit stops. Thus, reducing the power consumption is efficient in the diversity receiving apparatus 1.

On the contrary, when changing the status from inappropriate to appropriate or changing the status to inappropriate compulsorily, the status of the first demodulating unit 5 will be resumed. When the status is resumed, the supply to the clock signal will start again. After the restart of the clock signal, the stored amount of time frequency off-set will be used. Then, the initialization is completed, according to the demodulating in the first demodulating unit, the value of the storing unit will be updated, and the demodulating will be continued.

After the status is resumed, in the diversity receiving apparatus 1, the demodulating result of the first demodulating unit 5 will be used again.

Thus, the reception status of each branch is judged. It is possible to reduce the power consumption for the branch, whose reception status is judged inappropriate, by reducing or stopping the clock signal. Moreover, in advance of reducing or stopping the clock signal, by initializing the storing value, it is possible to prevent from malfunction after the status is resumed.

In addition, in Embodiments 1 to 4, although the diversity receiving apparatus 1, which is provided with two demodulating units of the first demodulating unit 5 and the second demodulating unit 6, is explained as the example, there may be three or more demodulating units (branches).

Moreover, the part of or the entire of the diversity receiving apparatus 1 may be constructed by hardware or software. The part of or the entire of the diversity receiving apparatus 1 may be constructed by a semiconductor integrated circuit.

Moreover, the operation (reduction or stop) of the clock signal may be controlled based on the reception status of any of the demodulating unit, the control may be performed when the reception operation of a demodulating unit is stopped (it is not used in the diversity receiving) or when it is judged that the quality of reception is enough. In this case, the reduced clock signal for the demodulating unit whose clock signal is reduced may be resumed to include the demodulating unit when the quality of reception needs to be improved by the diversity receiving including the demodulating unit.

When the apparatus is constructed by software, a processor, a ROM or a RAM, storing a program, is provided, thereby performing necessary processing.

A CPU reads the program stored in the ROM or the RAM. Next, the CPU performs the receiving of the OFDM signal, the demodulating of the OFDM signal, the decoding of the transmission control signal, the detecting of the frame synchronization and the processing of the diversity receiving.

INDUSTRIAL APPLICABILITY

The present invention can be preferably used, for example, in a field of a diversity receiving apparatus which is included in a mobile terminal for receiving digital terrestrial television services.

The invention claimed is:

1. A diversity receiving apparatus comprising:
a receiving unit operable to receive a frequency-division multiplexing signal that a carrier group including a data carrier, a pilot carrier and a transmission control carrier has been multiplexed thereon to output a receiving signal;
a first demodulating unit operable to demodulate the receiving signal to output a first data carrier;
a second demodulating unit operable to demodulate the receiving signal to output a second data carrier;
a timing adjusting unit operable to synchronize a processing timing of demodulating a carrier group by said first demodulating unit and a processing timing of demodulating a carrier group by said second demodulating unit; and
a combining/selecting unit operable to perform at least one of combining the first data carrier with the second data carrier, and selecting one of the first data carrier and the second data carrier,
wherein each of said first demodulating unit and said second demodulating unit comprises:
an analog-to-digital converter operable to digitize the receiving signal;
a wave detecting unit operable to detect a signal outputted by said analog-to-digital converter; and
a time-to-frequency converting unit operable to map a signal outputted by said wave detecting unit from a signal along a time axis to a signal along a frequency axis,
wherein either said first demodulating unit or said second demodulating unit comprises:
a decoding unit operable to decode a transmission control signal from a signal outputted by said time-to-frequency converting unit; and
a detecting unit operable to detect frame synchronization from a signal outputted by said time-to-frequency converting unit.

2. A diversity receiving apparatus comprising:
a receiving unit operable to receive a frequency-division multiplexing signal that a carrier group including a data carrier, a pilot carrier and a transmission control carrier has been multiplexed thereon to output a receiving signal;
a first demodulating unit operable to demodulate the receiving signal to output a first data carrier and a first transmission control carrier;
a second demodulating unit operable to demodulate the receiving signal to output a second data carrier and a second transmission control carrier;
a timing adjusting unit operable to synchronize a processing timing of demodulating a carrier group by said first demodulating unit and a processing timing of demodulating a carrier group by said second demodulating unit;
a first combining/selecting unit operable to perform at least one of combining the first transmission control carrier with the second transmission control carrier, and selecting either the first transmission control carrier or the second transmission control carrier;
a second combining/selecting unit operable to perform at least one of combining the first data carrier with the second data carrier, and selecting either the first data carrier or the second data carrier;
a decoding unit operable to decode a transmission control signal from a transmission control carrier combined or selected by said first combining/selecting unit; and
a detecting unit operable to detect frame synchronization from a transmission control carrier combined or selected by said first combining/selecting unit.

3. A diversity receiving apparatus as defined in claim 2, wherein said decoding unit decodes the transmission control signal from a transmission control carrier combined by said first combining/selecting unit, and said detecting unit detects the frame synchronization from a transmission control carrier combined by said first combining/selecting unit.

4. A diversity receiving apparatus as defined in claim 2, wherein:
said first demodulating unit comprises a first waveform equalizer operable to calculate a first reliability value indicating reliability of the first transmission control carrier and the first data carrier; and
said second demodulating unit comprises a second waveform equalizer operable to calculate a second reliability value indicating reliability of the second transmission control carrier and the second data carrier.

5. A diversity receiving apparatus as defined in claim 4, wherein said first combining/selecting unit selects either the first transmission control carrier or the second transmission control carrier in accordance with the first reliability value and the second reliability value.

6. A diversity receiving apparatus as defined in claim 4, wherein said first combining/selecting unit combines the first transmission control carrier with the second transmission control carrier in maximum ratio, in accordance with the first reliability value and the second reliability value.

7. A diversity receiving apparatus as defined in claim 4, wherein said second combining/selecting unit selects either the first data carrier or the second data carrier, in accordance with the first reliability value and the second reliability value.

8. A diversity receiving apparatus as defined in claim 4, wherein said second combining/selecting unit combines the first data carrier with the second data carrier in maximum ratio, in accordance with the first reliability value and the second reliability value.

9. A diversity receiving apparatus as defined in claim 2, wherein the frequency-division multiplexing signal comprises a unit of one symbol including a predetermined number of carriers, and wherein said timing adjusting unit synchronizes a processing timing of the symbol by said first demodulating unit and a processing timing of the symbol by said second demodulating unit.

10. A diversity receiving apparatus as defined in claim 2, wherein each of said first demodulating unit and said second demodulating unit comprises:
   an analog-to-digital converter operable to digitize the receiving signal;
   a wave detecting unit operable to detect a signal outputted by said analog-to-digital converter;
   a storing unit operable to store a signal outputted by said wave detecting unit; and
   a time-to-frequency converting unit operable to map a signal outputted by said storing unit from a signal along a time axis to a signal along a frequency axis,
   wherein said timing adjusting unit synchronizes a processing timing of demodulating a carrier group by said first demodulating unit and a processing timing of demodulating a carrier group by said second demodulating unit, by reading a signal stored by said storing unit in said first demodulating unit and a signal stored by said storing unit in said second demodulating unit at the same timing.

11. A diversity receiving apparatus as defined in claim 2, further comprising a control unit operable to control at least one of said first demodulating unit, said second demodulating unit, said first combining/selecting unit and said second combining/selecting unit,
   wherein said first demodulating unit comprises a first judging unit operable to judge reception status of said first demodulating unit, said first combining/selecting unit and said second combining/selecting unit,
   wherein said second demodulating unit comprises a second judging unit operable to judge reception status of said second demodulating unit, and
   wherein said control unit controls at least one of said first demodulating unit, said second demodulating unit, said first combining/selecting unit and said second combining/selecting unit, in accordance with a judgment result of said first judging unit and said second judging unit.

12. A diversity receiving apparatus as defined in claim 11,
   wherein said first judging unit judges reception status of said first demodulating unit, in accordance with at least one of an amplitude value and a variation value of the first pilot carrier, and
   wherein said second judging unit judges reception status of said second demodulating unit, in accordance with at least one of an amplitude value and a variation value of the second pilot carrier.

13. A diversity receiving apparatus as defined in claim 12,
   wherein said first judging unit judges reception status of said first demodulating unit appropriate when at least one of the amplitude value and the variation value of the first pilot carrier is greater than a predetermined threshold value, said first judging unit judges reception status of said first demodulating unit inappropriate when at least one of the amplitude value and the variation value of the first pilot carrier is equal or less than the predetermined threshold value, thereby output a judgment result to said control unit, and
   wherein said second judging unit judges reception status of said second demodulating unit appropriate when at least one of the amplitude value and the variation value of the second pilot carrier is greater than a predetermined threshold value, said second judging unit judges reception status of said second demodulating unit as inappropriate when at least one of the amplitude value and the variation value of the second pilot carrier is equal or less than the predetermined threshold value, thereby output a judgment result to said control unit.

14. A diversity receiving apparatus as defined in claim 13, wherein said control unit performs at least one of initializing storing value stored in a demodulating unit judged inappropriate and reducing clock signal to a demodulating unit judged inappropriate.

15. A diversity receiving apparatus as defined in claim 11, wherein each of said first demodulating unit and said second demodulating unit comprises a correcting unit operable to correct an amount of time frequency off-set to the receiving signal,
   wherein said first judging unit judges reception status of said first demodulating unit appropriate or inappropriate,
   wherein said second judging unit judges reception status of said second demodulating unit appropriate or inappropriate, and
   wherein said control unit keeps the amount of time frequency off-set stored by said correcting unit, and performs at least one of initializing storing value stored and reducing clock signal to a demodulating unit judged inappropriate.

16. A diversity receiving apparatus as defined in claim 11, wherein each of said first judging unit and said second judging unit judges reception status of a demodulating unit possessing the lower amplitude value among the amplitude values of the first demodulating unit and the second demodulating unit inappropriate, when a difference amplitude value between the first pilot carrier and the second pilot carrier is equal or greater than predetermined threshold value, and
   wherein said control unit performs at least one of initializing a value stored by the demodulating unit judged inappropriate and reducing clock signals to the demodulating unit judged inappropriate.

17. A diversity receiving apparatus as defined in claim 11, wherein said first judging unit integrates amplitude values of a predetermined number of the first pilot carrier and integrates amplitude value of predetermined number of first data carriers,
   wherein said first judging unit judges reception status of said first demodulating unit appropriate when an integrated value of the first pilot carriers is larger than an integrated value of the first data carriers, said first judging unit judges reception status of said first demodulating unit inappropriate when the integrated value of the first pilot carriers is equal or less than the integrated values of the first data carriers,
   wherein said second judging unit integrates amplitude values of a predetermined number of second pilot carriers and integrates amplitude values of a predetermined number of the second data carriers, and
   wherein said second judging unit judges reception status of said second demodulating unit appropriate when the integrated value of the second pilot carriers is larger than the integrated value of the second data carriers, said second judging unit judges reception status of said second demodulating unit inappropriate when the integrated value of the second pilot carriers is equal or less than the integrated value of the second data carriers.

18. A diversity receiving apparatus as defined in claim 2, further comprising a correcting unit operable to detect and correct an amount of time frequency off-set, in accordance with at least one of a first carrier group demodulated by said first demodulating unit and a second carrier group demodulated by said second demodulating unit.

19. A diversity receiving method comprising:
- receiving frequency-division multiplexing signal multiplexing a carrier group including a data carrier, a pilot carrier and a transmission control carrier to output a receiving signal;
- demodulating the receiving signal to output a first data carrier and a first transmission control carrier;
- demodulating the receiving signal to output a second data carrier and a second transmission control carrier;
- synchronizing a processing timing of demodulating the first data carrier and a processing timing of demodulating the second data carrier;
- performing at least one of combining the first transmission control carrier with the second transmission control carrier, and selecting one of the first transmission control carrier and the second transmission control carrier;
- performing at least one of combining the first data carrier with the second data carrier, and selecting one of the first data carrier and the second data carrier; and
- decoding frame synchronization and detecting frame synchronization from a transmission control carrier combined the first transmission control carrier with the second transmission control carrier or selected from the first transmission control carrier and the second transmission control carrier.

* * * * *